US010543866B2

(12) United States Patent
Araki et al.

(10) Patent No.: US 10,543,866 B2
(45) Date of Patent: Jan. 28, 2020

(54) VEHICLE

(71) Applicant: HONDA MOTOR CO., LTD., Tokyo (JP)

(72) Inventors: Makoto Araki, Wako (JP); Kazushi Akimoto, Wako (JP); Toru Takenaka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 128 days.

(21) Appl. No.: 15/845,454

(22) Filed: Dec. 18, 2017

(65) Prior Publication Data

US 2018/0178827 A1 Jun. 28, 2018

(30) Foreign Application Priority Data

Dec. 27, 2016 (JP) ................................ 2016-254460

(51) Int. Cl.

*B62D 5/08* (2006.01)
*B62D 5/00* (2006.01)
*B62D 6/10* (2006.01)
*B62K 21/00* (2006.01)
*B62K 11/14* (2006.01)

(52) U.S. Cl.

CPC ............... *B62D 5/008* (2013.01); *B62D 6/10* (2013.01); *B62K 21/00* (2013.01); *B62K 11/14* (2013.01)

(58) Field of Classification Search

CPC .......... B62D 5/008; B62D 6/10; B62K 21/00; B62K 11/14

See application file for complete search history.

(56) References Cited

U.S. PATENT DOCUMENTS

| | | | | |
|---|---|---|---|---|
| 4,600,207 A * | 7/1986 | Zosi | B62K 11/04 280/276 |
| 10,232,904 B2 * | 3/2019 | Toyota | B62J 99/00 |
| 2011/0232987 A1 * | 9/2011 | Chipp | B62J 1/12 180/311 |
| 2012/0083973 A1 | 4/2012 | Araki et al. | |
| 2012/0160601 A1 * | 6/2012 | Orihashi | F01N 13/102 181/228 |
| 2013/0066522 A1 * | 3/2013 | Haas | B62K 21/00 701/41 |

(Continued)

FOREIGN PATENT DOCUMENTS

| | | |
|---|---|---|
| JP | 2011-46342 A | 3/2011 |
| JP | 2014-172586 A | 9/2014 |

OTHER PUBLICATIONS

Extended European Search Report, dated May 30, 2018, for European Application No. 17207255.5.

*Primary Examiner* — Joseph M Rocca
*Assistant Examiner* — Marlon A Arce
(74) *Attorney, Agent, or Firm* — Birch, Stewart, Kolasch & Birch, LLP

(57) ABSTRACT

A vehicle includes a vehicle frame, a steering swivel unit supported on a head pipe of the vehicle frame and angularly movable about a steering axis, a front wheel angularly movable in unison with the steering swivel unit, and an automatic steering mechanism for angularly moving the steering swivel unit, wherein the vehicle frame includes a main frame extending rearwardly from the head pipe, and the steering mechanism includes a steering motor for angularly moving the steering swivel unit, the steering motor being supported on the main frame.

9 Claims, 26 Drawing Sheets

(56) References Cited

U.S. PATENT DOCUMENTS

| | | | | |
|---|---|---|---|---|
| 2014/0265224 | A1 | 9/2014 | Takenaka et al. | |
| 2014/0360800 | A1* | 12/2014 | Fujimoto | B60K 13/04 180/309 |
| 2016/0280307 | A1* | 9/2016 | Takenaka | B62K 21/00 |

* cited by examiner 1
3
3a
21
14
24
10
11
20
28
15
18
12
18b
26
19
810
18a
13
2a
27
Cs
17
25b
30
UP
FR
25L
2
25c UP
FR
540
13
33
36a
543
81
17
31
36
56
Cs
80
18
19
61
34
48
25e
25d
50
65a
46
45
65
53b
65b
30
70
53c
71
54
51
52
52a
42a
42
58
53
43
53a
52b
57
52c
47
62c
41
49
25b
25a
25c
25R
63
62

UP
FR
10
28
15
543
814
541b
540
811
810
812
812b
814a
812a
26
560c
815
813a
813d
812d
27d
813c
541
27c
813
813b
33
13
27b
25e
48
30
50
27a
27
18a
11
17
Cs
25L

VEHICLE

INCORPORATION BY REFERENCE

The present application claims priority under 35 U.S.C. § 119 to Japanese Patent Application No. 2016-254460 filed on Dec. 27, 2016. The content of the application is incorporated herein by reference in its entirety.

TECHNICAL FIELD

The present invention relates to a vehicle.

BACKGROUND ART

Heretofore, there has been known a vehicle where an actuator (drive source) for steering a front wheel is mounted on a front portion of a vehicle body (see, for example, Patent Document 1).

PRIOR ART DOCUMENT

Patent Document

[Patent Document 1]
Japanese Patent Laid-Open No. 2014-172586

SUMMARY OF THE INVENTION

Problem to be Solved by the Invention

In the vehicle that is provided with the drive source for steering the front wheel according to the above conventional art, it is desirable that the drive source be supported well with a simple structure.

The present invention has been made under the circumstances referred to above. In a vehicle that is provided with a drive source for steering a front wheel, it is desirable that the drive source be supported well with a simple structure.

Means for Solving the Problem

According to the aspect of the present invention, there is provided a vehicle including a vehicle including a vehicle frame (11), a steering swivel unit (13) supported on a head pipe (17) of the vehicle frame (11) and angularly movable about a steering axis (Cs), a front wheel (2) angularly movable in unison with the steering swivel unit (13), and a steering mechanism (31) for angularly moving the steering swivel unit (13), wherein the vehicle frame (11) includes a main frame (18) extending rearwardly from the head pipe (17), and the steering mechanism (31) includes a drive source (80) for angularly moving the steering swivel unit (13), the drive source (80) being supported on the main frame (18).

In the above invention, the drive source (80) may be disposed rearwardly of the head pipe (17) and centrally in transverse directions of the vehicle.

In the above invention, the main frame (18) may include a pair of left and right main frames (18*b*) extending rearwardly from the head pipe (17), the drive source (80) being disposed in a position between the left and right main frames (18*b*) in transverse directions of the vehicle.

In the above invention, the vehicle may further include a pair of left and right upward extensions (501) which extend upwardly from the left and right main frames (18*b*), and the drive source (80) may be supported on the main frame (18) through the upward extensions (501) and disposed between the left and right upward extensions (501).

In the above invention, the vehicle may further include a cross member (503) which interconnects the left and right upward extensions (501) in the transverse directions of the vehicle, the drive source (80) being mounted on a lower surface of the cross member (503).

In the above invention, a speed reducer (502) for reducing the speed of output power of the drive source (80) may be supported on the cross member (503).

In the above invention, the drive source (80) may include an electric motor and is disposed such that a central axis (80*c*) of a rotational shaft (80*a*) of the drive source (80) is oriented in vertical directions.

In the above invention, the drive source (80) may be coupled to the steering swivel unit (13) by a link (81) which is positioned outwardly of the head pipe (17) in transverse directions of the vehicle.

In the above invention, the steering mechanism (31) may include a transmitted torque changing mechanism (610) for changing a torque transmitted between the drive source (80) and the steering swivel unit (13).

In the above invention, the steering mechanism (31) may include a separating mechanism for separating the drive source (80) from a power transmitting path between the drive source (80) and the steering swivel unit (13).

In the above invention, the vehicle may further include a torque sensor for detecting a torque produced between the steering swivel unit (13) and the drive source (80), and a controller (83) for controlling the drive source in order to reduce a detected value from the torque sensor.

A vehicle according to the present invention includes a steering swivel unit supported on a head pipe and angularly movable about a steering axis, a front wheel angularly movable in unison with the steering swivel unit, and a steering mechanism for angularly moving the steering swivel unit, wherein a vehicle frame includes a main frame extending rearwardly from the head pipe, and a drive source for angularly moving the steering swivel unit is supported on the main frame. The drive source of the steering mechanism is supported well with a simple structure by utilizing the main frame.

In the above invention, the drive source may be disposed rearwardly of the head pipe and centrally in transverse directions of the vehicle. With this arrangement, the vehicle has a good weight balance in the transverse directions thereof.

In the above invention, the main frame may include a pair of left and right main frames extending rearwardly from the head pipe, the drive source being disposed in a position between the left and right main frames in transverse directions of the vehicle. With this arrangement, the drive source is effectively supported, using the left and right main frames. Since the drive source is positioned in a space between the left and right main frames, the drive source is covered with the main frames and is protected thereby and concealed for a better appearance.

In the above invention, a pair of left and right upward extensions may be provided which extend upwardly from the left and right main frames, and the drive source may be supported on the main frame through the upward extensions and disposed between the left and right upward extensions. With this arrangement, the drive source that is covered with the upward extensions is protected thereby and concealed for a better appearance. The drive source is disposed in a high position, making it easy to transmit power thereof to the upper portion of the steering swivel unit.

In the above invention, a cross member may be provided which interconnects the left and right upward extensions in the transverse directions of the vehicle, the drive source being mounted on a lower surface of the cross member. With this arrangement, the cross member increases the rigidity of the main frame, and covers the drive source to protect the drive source and provide an improved appearance.

In the above invention, a speed reducer for reducing the speed of output power of the drive source may be supported on the cross member. With this arrangement, the speed reducer is supported with a simple structure.

In the above invention, the drive source may include an electric motor and may be disposed such that a central axis of a rotational shaft thereof is oriented in vertical directions. With this arrangement, the drive source may be disposed compactly in the transverse directions of the vehicle.

In the above invention, the drive source may be coupled to the steering swivel unit by a link which is positioned outwardly of the head pipe in transverse directions of the vehicle. With this arrangement, the drive source is capable of exerting large drive power to the steering swivel unit, making it possible to turn the steering swivel unit with ease.

In the above invention, the steering mechanism may include a transmitted torque changing mechanism for changing a torque transmitted between the drive source and the steering swivel unit. With this arrangement, the transmitted torque can be changed when necessary to allow the drive source to turn the steering swivel unit with ease, and to prevent the drive source from presenting an obstacle to the turning of the steering swivel unit.

In the above invention, the steering mechanism may include a separating mechanism for separating the drive source from the power transmitting path between the drive source and steering swivel unit. With this arrangement, when the drive source is not actuated, the drive source may be separated from the power transmitting path and hence prevented from presenting an obstacle to the turning of the steering swivel unit.

In the above invention, the vehicle may include a torque sensor for detecting a torque produced between the steering swivel unit and the drive source, and a controller for controlling the drive source in order to reduce a detected value from the torque sensor. With this arrangement, when the rider manually turns the steering swivel unit, drive power from the drive source assists in turning the steering swivel unit, making it easy for the rider to turn the steering swivel unit.

MODES FOR CARRYING OUT THE INVENTION

Figure 1:
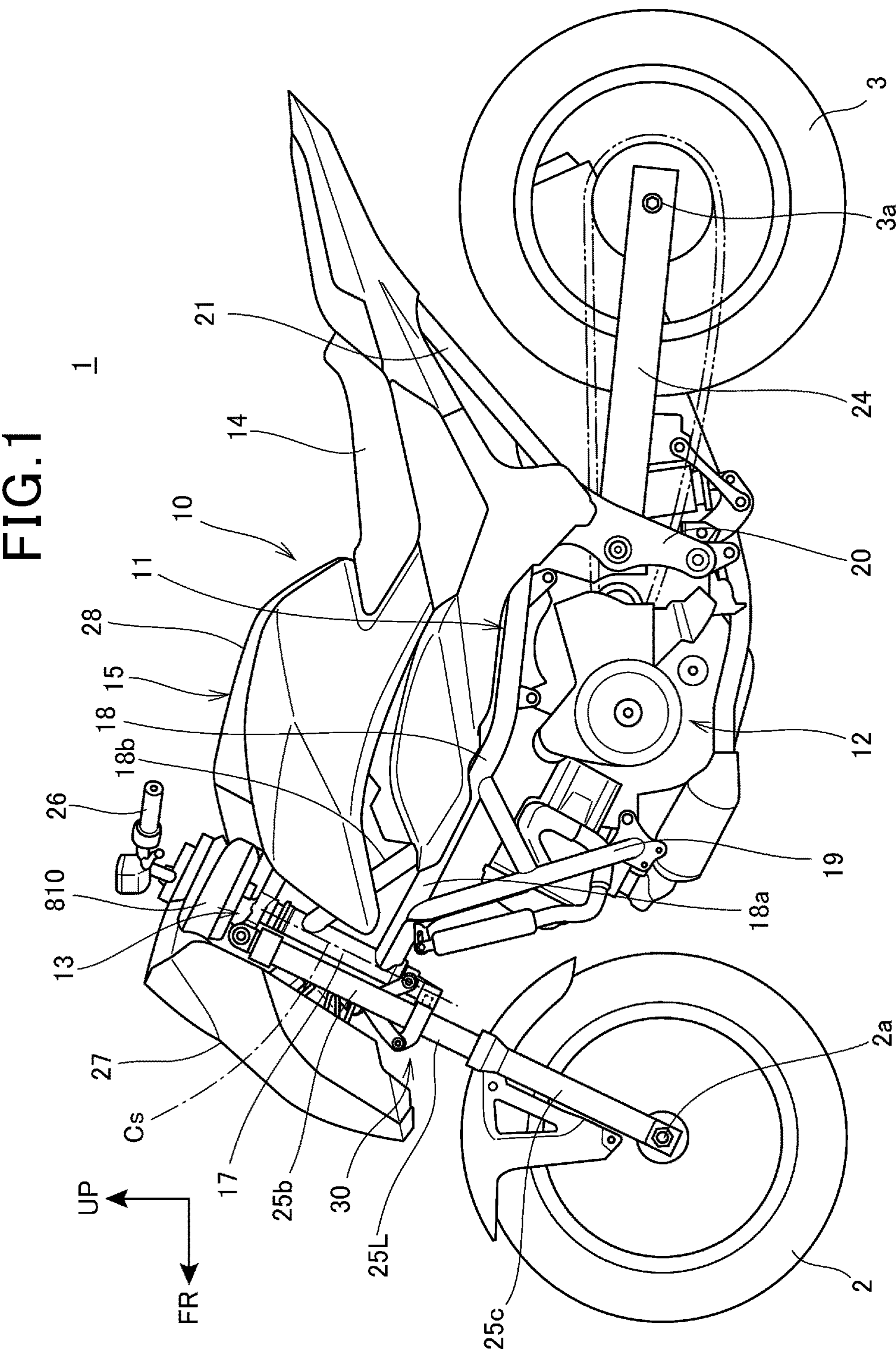
FIG. 1 is a left-hand side elevational view of a vehicle according to a first embodiment of the present invention.

Embodiments of the present invention will be described below with reference to the drawings. Unless specified otherwise, directions such as forward, rearward, leftward, rightward, upward, downward, and similar directions referred to herein shall be identical to those used on a vehicle to be described below. The reference characters "FR," "UP, and "LH" depicted in some figures of the drawings represent forward, upward, and leftward directions, respectively, on the vehicle.

First Embodiment

FIG. 1 is a left-hand side elevational view of a vehicle 1 according to a first embodiment of the present invention.

As depicted in FIG. 1, the vehicle 1 includes a motorcycle having a vehicle body 10, a front wheel 2 disposed forwardly of the vehicle body 10, a rear wheel 3 disposed rearwardly of the vehicle body 10.

The vehicle body 10 includes a vehicle frame 11, an engine 12 serving as a power unit supported on the vehicle frame 11 for propelling the vehicle 1, a steering swivel unit 13 angularly movable about a steering axis Cs on the front end of the vehicle frame 11, a seat 14 for the rider (driver)

to sit thereon, and a vehicle cover 15 covering the vehicle frame 11, etc. The vehicle 1 may also be referred to as a saddle riding vehicle with the rider sitting astride the seat 14. The rear wheel 3 is a propulsive drive wheel that is rotated by the power of the engine 12. Alternatively, the front wheel 2 may be a propulsive drive wheel with an electric motor incorporated therein for rotating the front wheel 2.

The vehicle frame 11 has a head pipe 17 disposed on the front end thereof and supporting the steering swivel unit 13 thereon, a main frame 18 extending rearwardly and downwardly from the head pipe 17, a down frame 19 extending downwardly from a front portion of the main frame 18, a pivot frame 20 extending downwardly from a rear portion of the main frame 18, and a seat frame 21 extending rearwardly from an upper portion of the pivot frame 20.

The head pipe 17 includes a tubular component inclined rearwardly from a vertical direction as viewed in side elevation. The head pipe 17 is disposed centrally in the vehicle 1 along transverse directions thereof, i.e., leftward and rightward directions thereof, as are the front wheel 2 and the rear wheel 3. The steering axis Cs is in alignment with the axis of the head pipe 17.

The vehicle 1 also includes a front fork including left and right front fork legs 25L and 25R (front wheel support members) supported on the steering swivel unit 13 and extending forwardly and downwardly therefrom, and a swing arm 24 extending rearwardly from the pivot frame 20 and supporting the rear wheel 3 on its rear end. The rear wheel 3 is rotatably supported on the rear end of the swing arm 24 by an axle 3*a* provided thereon.

The front fork legs 25L and 25R are disposed as a pair on the left and right sides of the front wheel 2. The front wheel 2 is rotatably supported on the lower ends of the front fork legs 25L and 25R by an axle 2*a* provided thereon which extends in the transverse directions of the vehicle 1.

The front fork legs 25L and 25R rotate in unison with the steering swivel unit 13. A steering handle 26 that is manipulated by the rider is mounted on an upper portion of the steering swivel unit 13 by a steering handle turning mechanism 540 (FIG. 5) that serves as a handle support member. When the rider turns the steering handle 26, the steering swivel unit 13 turns about the steering axis Cs, steering the front wheel 2 to the left or right.

The vehicle cover 15 has a front cover 27 positioned forwardly of the head pipe 17 and a tank cover 28 covering an area between the head pipe 17 and the seat 14.

Basic technical features of the present embodiment will be described below with reference to FIGS. 2 through 4B.

Figure 2:
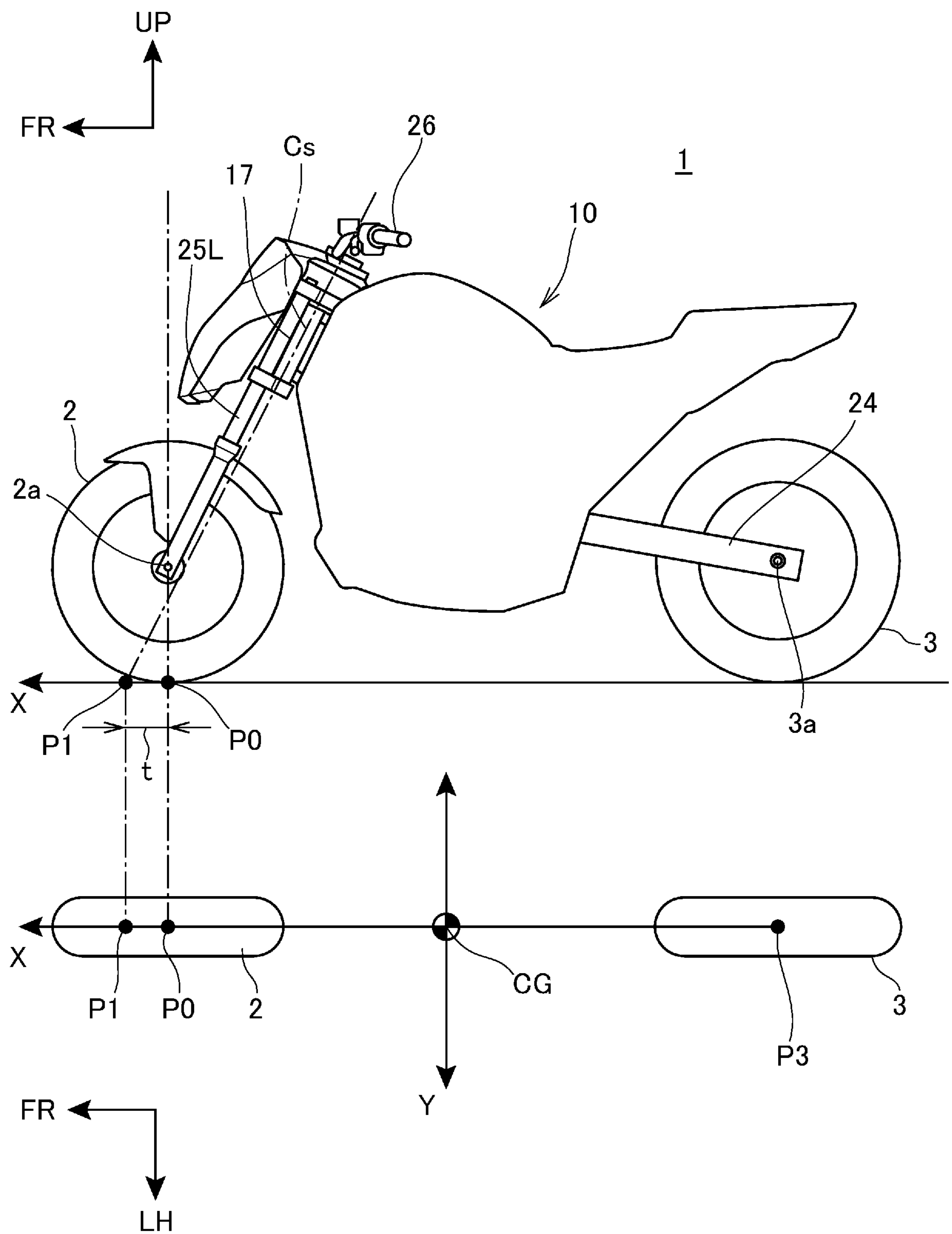
FIG. 2 is a left-hand side elevational view of the vehicle where the trail length is positive.
Figure 3:
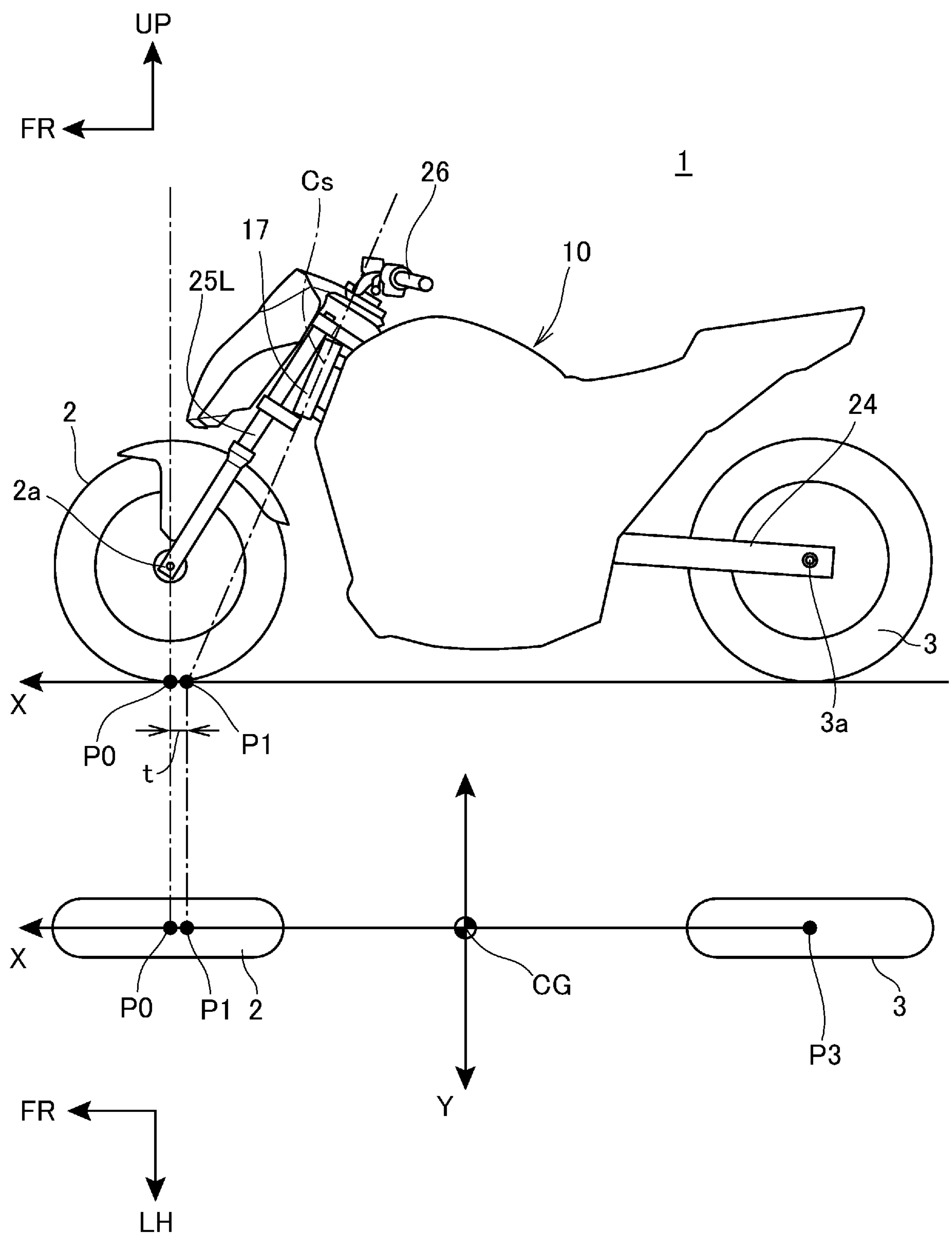
FIG. 3 is a left-hand side elevational view of the vehicle where the trail length is negative.
Figure 4A:
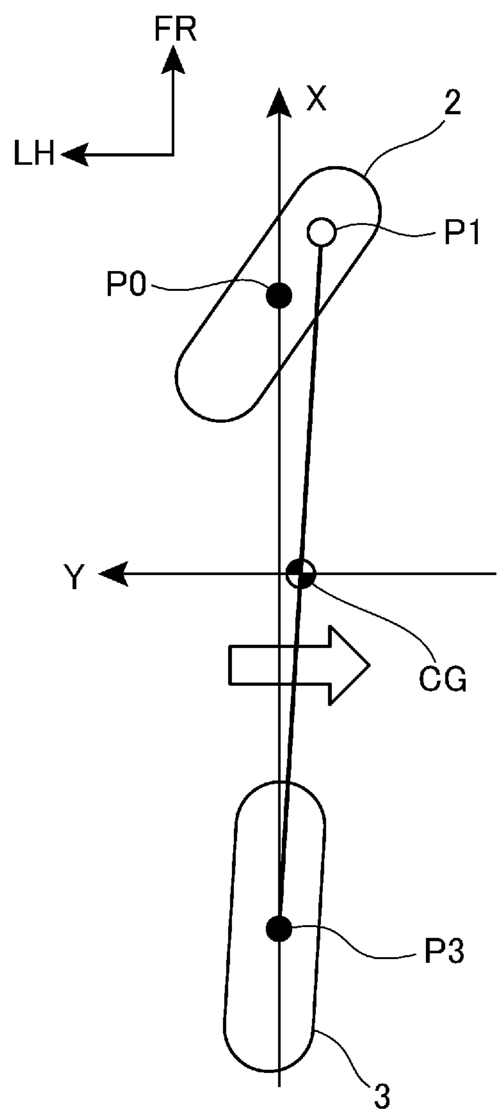
FIGS. 4A and 4B are schematic views depicting the relationship between the steering direction of a front wheel and the position of the center of gravity of the vehicle.
Figure 4B:
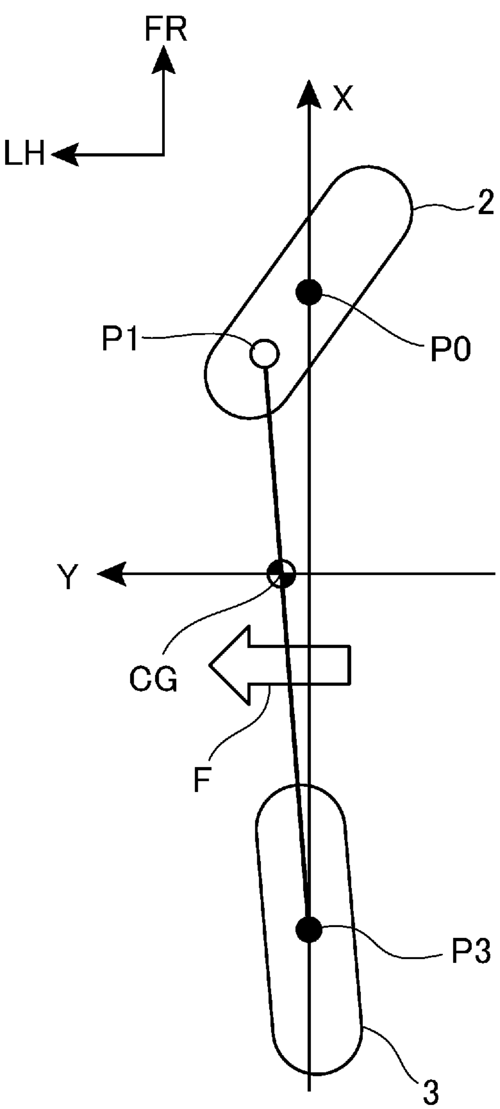

FIG. 2 is a left-hand side elevational view of the vehicle 1 where the trail length is positive. FIG. 3 is a left-hand side elevational view of the vehicle 1 where the trail length is negative. FIGS. 4A and 4B are schematic views depicting the relationship between the steering direction of the front wheel 2 and the position of the center of gravity of the vehicle 1. In FIGS. 2 and 3, the position of the center of gravity of the vehicle 1 is depicted in a lower portion of the figure. In FIGS. 2 through 4B, a longitudinal direction of the vehicle 1 is indicated by the direction X, and rolling directions of the vehicle 1, i.e., directions about the axis represented by the direction X, are indicated by the direction Y. The forward direction FR of the vehicle 1 is aligned with the direction X, whereas the leftward direction LH of the vehicle 1 is aligned with the direction Y.

FIGS. 2 and 3 depict the vehicle 1 is in a reference posture state wherein the vehicle 1 is standing up and the front wheel 2 has a steering angle of 0°.

The trail length, denoted by t, represents the distance between the point P0 of contact between the front wheel 2 and the ground and the point P1 of contact between the steering axis Cs and the ground. The trail length t is positive forwardly of the point P0 of contact and negative rearwardly of the point P0 of contact. The point P0 of contact between the front wheel 2 and the ground is positioned directly below the axle 2*a*. The point P3 of contact between the rear wheel 3 and the ground is positioned directly below the axle 3*a* of the rear wheel 3.

In FIG. 2, the point P1 of contact between the steering axis Cs and the ground is positioned forwardly of the point P0 of contact between the front wheel 2 and the ground, so that the trail length t is of a positive value. In FIG. 3, the point P1 of contact between the steering axis Cs and the ground is positioned rearwardly of the point P0 of contact between the front wheel 2 and the ground, so that the trail length t is of a negative value.

As the front fork legs 25L and 25R are tilted further rearwardly with respect to the steering axis Cs from the state depicted in FIG. 2, the point P0 of contact between the front wheel 2 and the ground is moved forwardly until the trail length t is of a negative value as depicted in FIG. 3.

The state depicted in FIG. 2 in which the trail length t is positive is referred to as a "normal state," whereas the state depicted in FIG. 3 in which the trail length t is negative is referred to as a "trail-length-changed state." In other words, when the front fork legs 25L and 25R are tilted rearwardly with respect to the vehicle body 10 from the "normal state," the vehicle 1 enters the "trail-length-changed state."

As depicted in FIGS. 2 and 3, in the reference posture state, the center CG of gravity of the vehicle 1 is positioned centrally in the transverse directions of the vehicle 1 and between the front wheel 2 and the rear wheel 3.

While the vehicle 1 is traveling, the point of contact of the front wheel 12 with the ground moves in a steered direction (a direction in which the vehicle 1 is steered) because the front wheel 2 is rolling, causing a force to be produced on the center CG of gravity in a direction opposite to the steered direction. In other words, when the vehicle 1 is steered in a direction to cause the vehicle body 10 to fall over, a force is produced in a direction to raise the vehicle body 10.

On the other hand, while the vehicle 1 is at rest, as depicted in FIG. 4A, when the front wheel 2 is steered (to the right in FIG. 4A) in the "normal state," the center G of gravity of the vehicle 1 moves in the same direction (rightward direction) as the steered direction. Therefore, providing the vehicle 1 is in the "normal state" while at rest, when the vehicle 1 is steered in a direction to cause the vehicle body 10 to fall over, a force is produced in a direction to cause the vehicle body 10 to fall over more. This direction of the force is opposite to the direction of the force produced while the vehicle 1 is traveling. In other words, the direction of a force that is produced and acts on the center CG of gravity of the vehicle 1 when the vehicle 1 is steered is reversed as the speed of the vehicle 1 varies. In this manner, since there exists a vehicle speed range wherein the direction of a force acting on the center CG of gravity is reversed while the vehicle 1 is in the "normal state," it is difficult to control falling-over of the vehicle body 10 by steering the vehicle 1, making it difficult to realize a control process for making the vehicle 1 stand on its own by steering itself.

As depicted in FIG. 4B, when the front wheel 2 is steered (to the right in FIG. 4B) in the "trail-length-changed state," the center G of gravity of the vehicle 1 moves in the opposite direction (leftward direction) to the steered direction. In the "trail-length-changed state," therefore, when the front wheel 2 is steered, the center G of gravity of the vehicle 1 moves in the opposite direction to the steered direction. As a result, when the vehicle 1 is steered in a direction to cause the vehicle body 10 to fall over, a force F is produced in a direction to raise the vehicle body 10. In other words, while the vehicle 1 is in the "trail-length-changed state," a force acting on the center CG of gravity of the vehicle 1 by steering the vehicle 1 is produced in the same direction at all times when the vehicle 1 is at rest and traveling. Consequently, it is possible to keep continuity in controlling falling-over of the vehicle body 10 by steering the vehicle 1. In the "trail-length-changed state," therefore, it is easier to realize a control process for making the vehicle 1 stand on its own by steering itself than in the "normal state."

In addition to the force F, a force produced by the movement of the point of contact of the front wheel 2 with the ground in a rolling direction of the front wheel 2 when the front wheel 2 is steered may be taken into consideration in a control process for making the vehicle 1 stand on its own.

The vehicle 1 includes a trail-length changing mechanism 30 disposed forwardly of the head pipe 17, for changing the trail length t of the front wheel 2. The structural details of the trail-length changing mechanism 30 and peripheral parts disposed thereabout will be described below.

Figure 5:
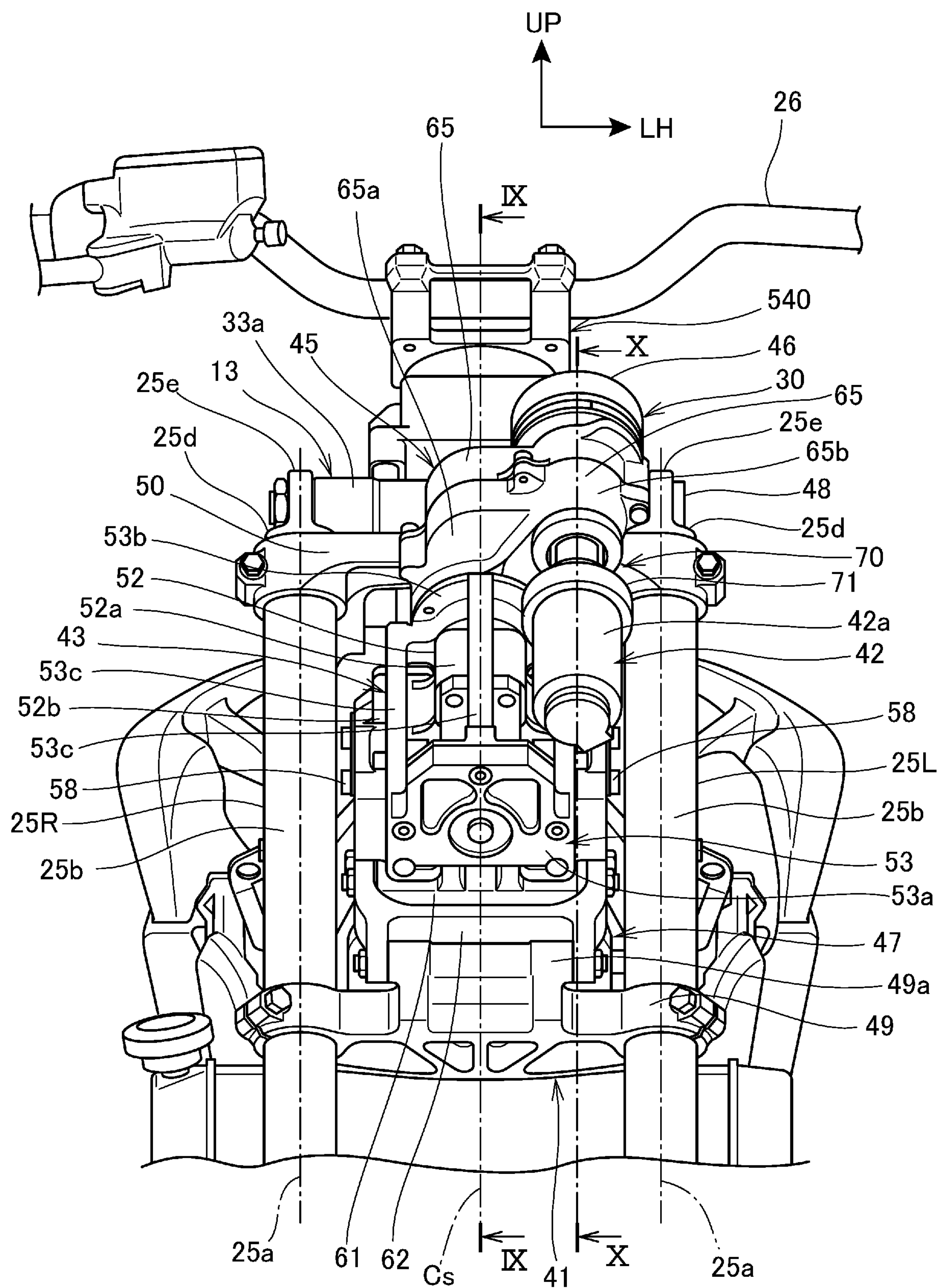
FIG. 5 is a front elevational view of a front portion of the vehicle.
Figure 6:
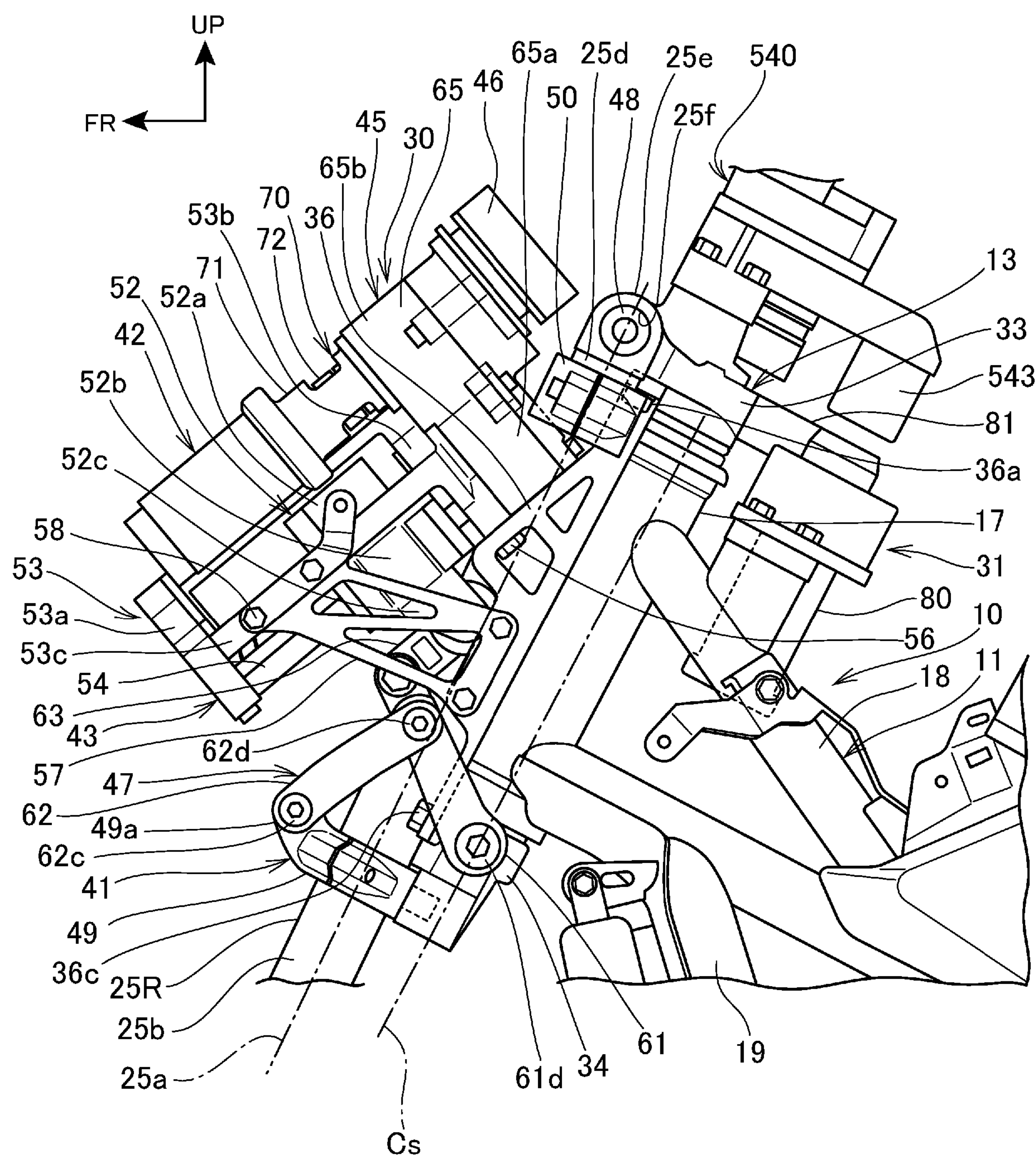
FIG. 6 is a left-hand side elevational view of the front portion of the vehicle in a "normal state."
Figure 7:
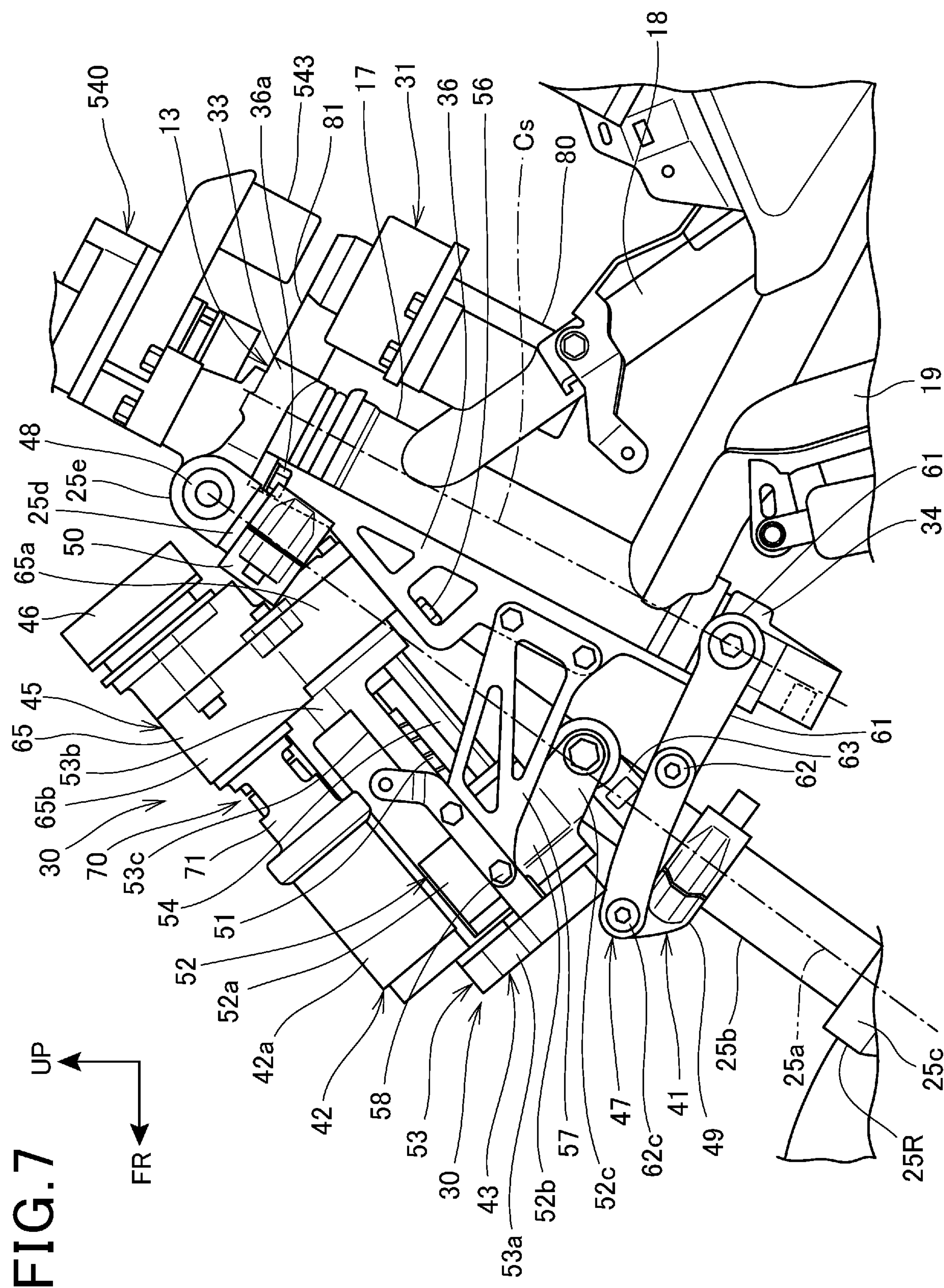
FIG. 7 is a left-hand side elevational view of the front portion of the vehicle in a "trail-length-changed state."
Figure 8:
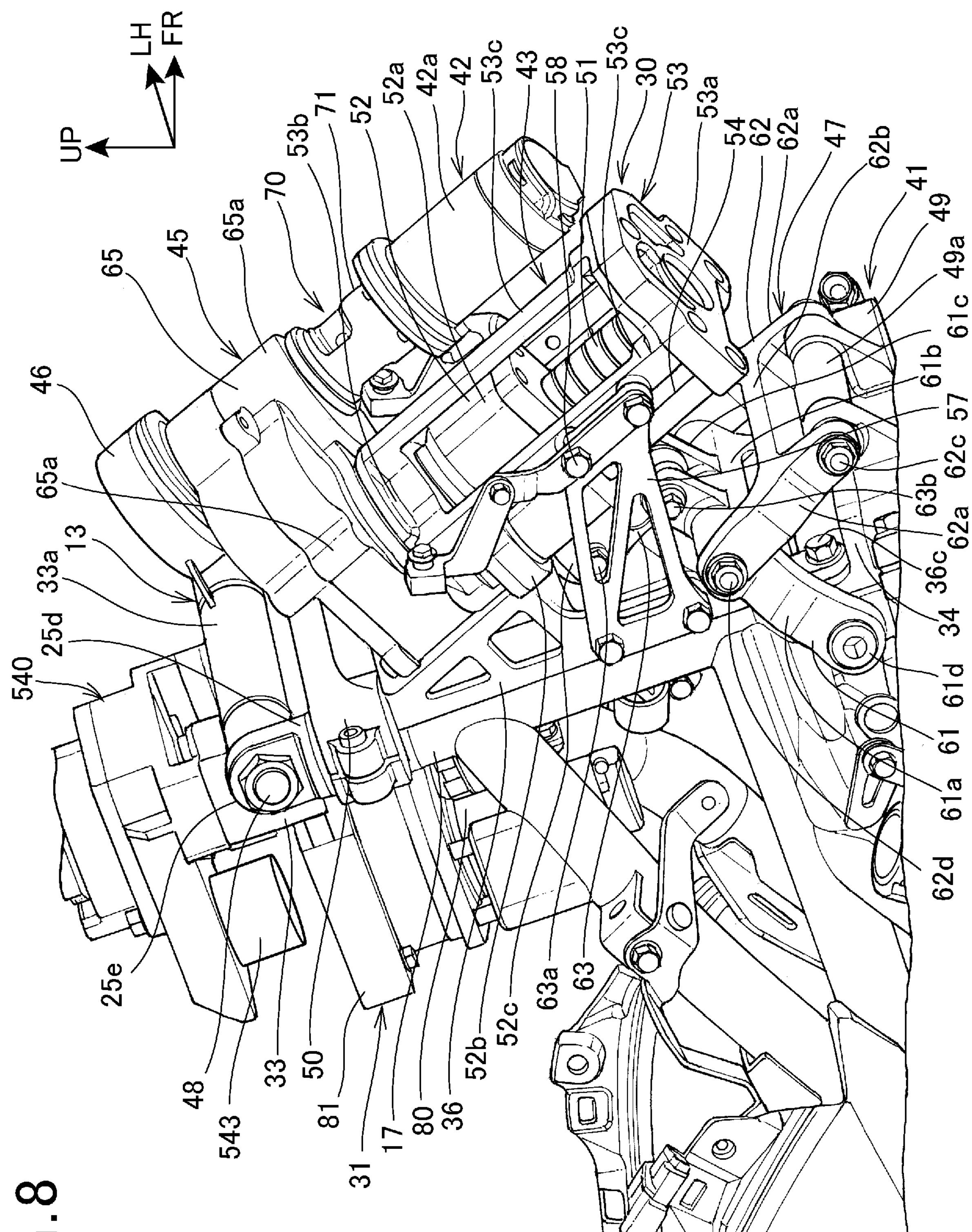
FIG. 8 is a perspective view of the front portion of the vehicle as viewed from a front right viewpoint.
Figure 9:
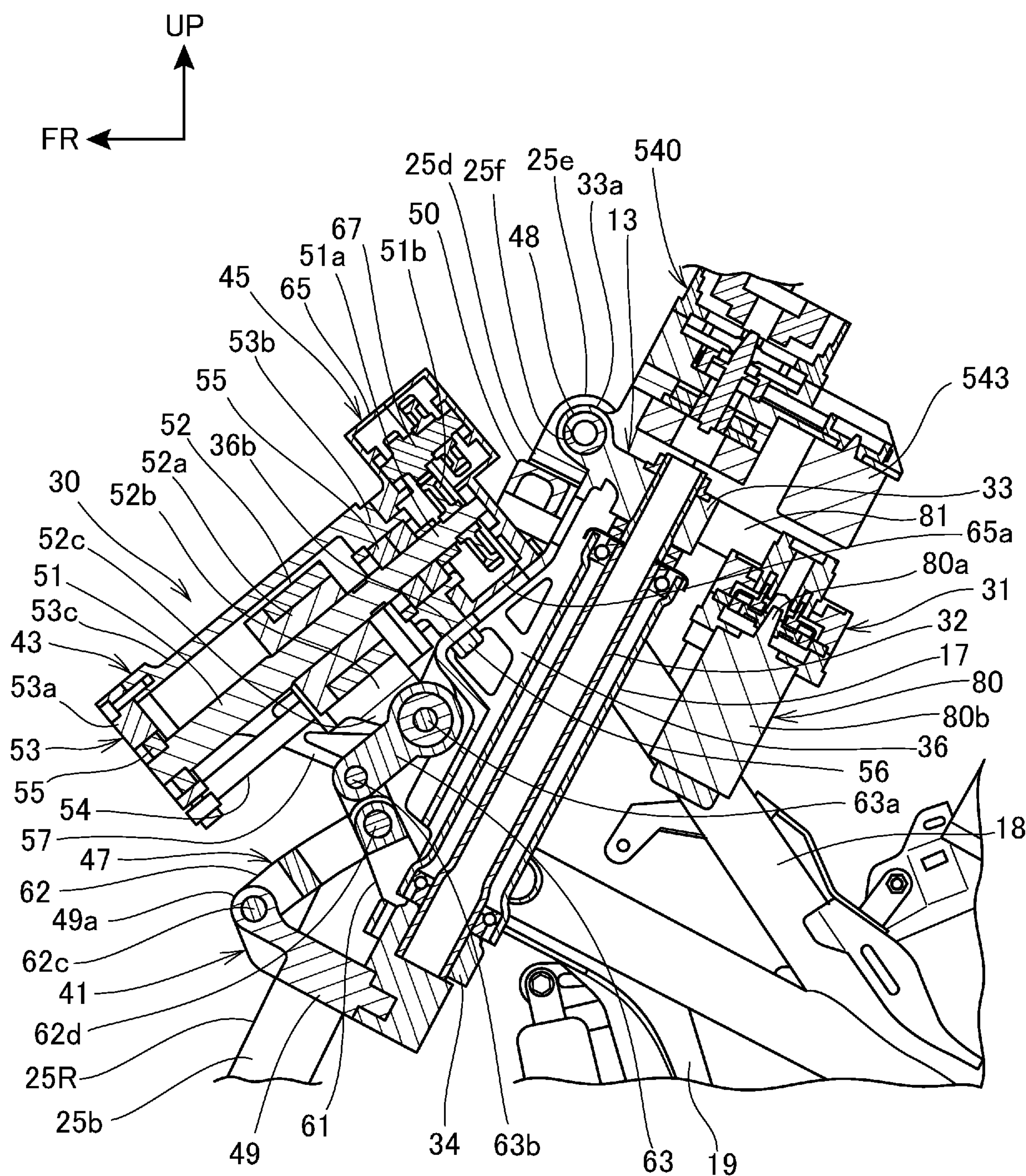
FIG. 9 is a cross-sectional view taken along line IX-IX of FIG. 5.

FIG. 5 is a front elevational view of a front portion of the vehicle 1. FIG. 6 is a left-hand side elevational view of the front portion of the vehicle 1 in the "normal state." FIG. 7 is a left-hand side elevational view of the front portion of the vehicle 1 in the "trail-length-changed state." FIG. 8 is a perspective view of the front portion of the vehicle 1 as viewed from a front right viewpoint. FIG. 9 is a cross-sectional view taken along line IX-IX of FIG. 5. In FIGS. 5 through 9, the vehicle cover 15 is omitted from illustration. In FIGS. 6 and 7, the left front fork leg 25L is omitted from illustration. In FIG. 8, the front fork legs 25L and 25R are omitted from illustration.

As depicted in FIGS. 5 through 9, the steering swivel unit 13 includes a steering shaft 32 (FIG. 9) inserted in and rotatably supported by the head pipe 17, a top bridge 33 fixed to the upper end of the steering shaft 32 that projects upwardly from the head pipe 17, and a bottom member 34 fixed to the lower end of the steering shaft 32 that projects downwardly from the head pipe 17.

The top bridge 33 is a plate-like member extending in the transverse directions of the vehicle 1 above the head pipe 17, with a bar-like steering handle 26 provided above the top bridge 33. The steering shaft 32 has a central axis aligned with the steering axis Cs. The steering shaft 32, the top bridge 33, and the bottom member 34 of the steering swivel unit 13 are angularly movable about the steering axis Cs.

A bracket 36 is mounted on the steering swivel unit 13. The bracket 36 is disposed between the left and right front fork legs 25L and 25R and forwardly of the head pipe 17, and extends vertically along the head pipe 17, joining the top bridge 33 and the bottom member 34 to each other. The bracket 36 has an upper end fixed to a lower surface of the top bridge 33 by a bolt 36*a* (FIG. 7). The bracket 36 has a lower end fixed to a front surface of the bottom member 34 by a bolt 36*c* (FIGS. 6, 8). The bracket 36 is angularly movable in unison with the steering swivel unit 13.

The trail-length changing mechanism 30 includes a swing assembly 41 coupled to the steering swivel unit 13 and swingable in forward and rearward directions, an electric motor 42 for supplying drive power to actuate the swing assembly 41, and a ball screw mechanism 43 (screw mechanism) for converting rotation of the electric motor 42 into linear motion that is transmitted to cause the swing assembly 41 to swing.

The trail-length changing mechanism 30 also includes a speed reducer 45 for transmitting rotation of the electric motor 42 at a reduced ratio to the ball screw mechanism 43, a lock mechanism 46 for limiting the electric motor 42 against rotation, and a link mechanism 47 that couples the ball screw mechanism 43 to the swing assembly 41 and the steering swivel unit 13.

The swing assembly 41 of the trail-length changing mechanism 30 includes a swing shaft 48 extending in the transverse directions of the vehicle 1 and coupling the front fork legs 25L and 25R swingably to the steering swivel unit 13, and a bottom bridge 49 (bridge member) coupling the front fork legs 25L and 25R to each other and coupled to the link mechanism 47.

The front fork legs 25L and 25R are also coupled to each other in the transverse directions of the vehicle 1 by a coupling member 50 disposed above the bottom bridge 49.

In the "normal state" depicted in FIG. 6, each of the front fork legs 25L and 25R has its fork leg axis 25*a* (axis) extending in axial directions thereof and disposed forwardly of the head pipe 17 substantially parallel to the steering axis Cs.

Each of the front fork legs 25L and 25R includes a fixed tube 25*b* supported on the bottom bridge 49, a movable tube 25*c* (FIG. 1) axially telescopically combined with the fixed tube 25*b*, and a fork leg cap 25*d*.

The front fork legs 25L and 25R include an electronically controlled suspension capable of automatically changing their length along the fork leg axes 25*a*. The length of the front fork legs 25L and 25R can be changed by changing the preload of suspension springs disposed in the front fork legs 25L and 25R with actuators 25*g* (FIG. 11) provided in the respective front fork legs 25L and 25R.

The fixed tubes 25*b* and the movable tubes 25*c* house suspension springs, oil, etc. incorporated therein. The fork leg caps 25*d* close openings defined in upper surfaces of the fixed tubes 25*b*. Specifically, the fork leg caps 25*d* are fastened to respective upper end portions of the fixed tubes 25*b* by having externally threaded outer peripheral surfaces thereof held in threaded engagement with respective internally threaded inner peripheral surfaces of the upper end portions of the fixed tubes 25*b*.

The coupling member 50 couples the upper end portions of the fixed tubes 25*b* laterally to each other, and the bottom bridge 49 couples respective lower portions of the fixed tubes 25*b* laterally to each other.

Each of the fork leg caps 25*d* has an extension 25*e* extending upwardly beyond the upper end of the fixed tube 25*b*. The extension 25*e* has a swing shaft insertion hole 25*f* defined therein which extends therethrough in the transverse directions of the vehicle 1.

The top bridge 33 of the steering swivel unit 13 has a tubular swing shaft support 33*a* on a front end thereof that extends forwardly of the head pipe 17, the tubular swing shaft support 33*a* extending in the transverse directions of the vehicle 1. The swing shaft 48 is coupled to the top bridge 33 by being inserted through the tubular swing shaft support 33*a*.

The swing shaft insertion holes 25*f* of the respective fork leg caps 25*d* are fitted respectively over the opposite ends of the swing shaft 48 that project from the tubular swing shaft 33*a* in the transverse directions of the vehicle 1, so that the front fork legs 25L and 25R are swingably supported on the swing shaft 48.

Specifically, when the vehicle 1 is viewed in side elevation, the swing shaft 48 is positioned on the fork leg axes 25*a* and disposed in alignment with the fork leg axes 25*a*.

In other words, the front fork legs 25L and 25R are coupled to the top bridge 33 by the swing shaft 48 that is provided on their upper ends, and are swingable in the forward and rearward directions, i.e., the longitudinal directions, of the vehicle 1 about the central axis of the swing shaft 48 positioned on the fork leg axes 25*a*.

The bottom bridge 49 of the swing assembly 41 has a tubular swing-assembly-side link joint 49*a* extending in the transverse directions of the vehicle 1 and provided on the front end of a central portion thereof in the transverse directions of the vehicle 1. The link mechanism 47 has a front end joined to the tubular swing-assembly-side link joint 49*a*.

When the link mechanism 47 is operated from the "normal state" depicted in FIG. 6, the bottom bridge 49 is moved forwardly, and the front fork legs 25L and 25R are swung about the swing shaft 48, as depicted in FIG. 7. Details of the link mechanism 47 will be described later.

According to the first embodiment, the front fork legs 25L and 25R are angularly movable with the front wheel 2 about the steering axis Cs, and also swingable with the front wheel 2 forwardly and rearwardly about the swing axis 48.

The ball screw mechanism 43 includes a screw shaft 51, a nut member 52 threaded over the screw shaft 51, a housing 53 supporting the screw shaft 51 housed therein, and a guide member 54 extending parallel to the screw shaft 51.

The housing 53 has a lower wall 53*a* supporting one end (lower end) of the screw shaft 51, an upper wall 53*b* supporting the other end (upper end) of the housing 53, and a plurality of joints 53*c* vertically interconnecting the peripheral edge of the lower wall 53*a* and the peripheral edge of the upper wall 53*b*.

The lower wall 53*a* and the upper wall 53*b* are each formed as a plate lying perpendicularly to the screw shaft 51. The screw shaft 51 is rotatably supported on the lower wall 53*a* and the upper wall 53*b* by respective bearings 55 disposed centrally in the lower wall 53*a* and the upper wall 53*b*. The joints 53*c* extend substantially parallel to the screw shaft 51.

The guide member 54 is formed as a shaft interconnecting the lower wall 53*a* and the upper wall 53*b*, and disposed behind the screw shaft 51.

The nut member 52 includes a nut 52*a* threaded over the screw shaft 51 and a movable block 52*b* movably mounted on the guide member 54 integrally with the nut 52*a*. The movable block 52*b* includes a screw-mechanism-side link joint 52*c* extending out of the housing 53 toward the head pipe 17 which is disposed behind the ball screw mechanism 43.

The other end, denoted by 51*a* in FIG. 9, of the screw shaft 51 extends upwardly through the upper wall 53*b*, with an input gear 51*b* provided on the other end 51*a*.

The ball screw mechanism 43 is disposed in such a posture that the screw shaft 51 is inclined rearwardly from the vertical directions, as viewed in side elevation. The screw shaft 51 is inclined rearwardly at a larger angle than the steering axis Cs.

The bracket 36 has a mount surface 36*b* on its front side that is inclined rearwardly at a larger angle than the steering axis Cs. The housing 53 of the ball screw mechanism 43 has an upper rear surface held against the mount surface 36*b*. The ball screw mechanism 43 is firmly fastened to the mount surface 36*b* by a bolt 56 that is inserted from behind through the mount surface 36*b* and the housing 53.

Support pieces 57 that extend forwardly are mounted respectively on left and right side surfaces of a lower portion of the bracket 36.

The ball screw mechanism 43 is fixed to the support pieces 57 by bolts 58 that are inserted from outside to front end portions of the support pieces 57 in the transverse directions of the vehicle 1 and fastened to the joints 53*c*.

The ball screw mechanism 43 that is secured to the steering swivel unit 13 by the bracket 36 is angularly movable in unison with the steering swivel unit 13 in the direction in which the front wheel 2 is steered.

The ball screw mechanism 43 is positioned forwardly of the steering swivel unit 13, and is disposed between the left and right front fork legs 25L and 25R as viewed in front elevation in FIG. 5. The screw shaft 51 is positioned centrally in the transverse directions of the vehicle 1 as is the case with the steering axis Cs, and extends vertically. The ball screw mechanism 43 is disposed vertically between the swing shaft 48 and the bottom bridge 49.

The link mechanism 47 includes a first link 61 extending forwardly from the bottom member 34, a second link 62 extending rearwardly from the bottom bridge 49 and coupled to a front portion of the first link 61, and a third link 63 interconnecting the first link 61 and the movable block 52*b* of the ball screw mechanism 43.

Specifically, as depicted in FIG. 8, the first link 61 includes a pair of left and right arms 61*a* extending forwardly from respective left and right side surfaces of the bottom member 34, a tubular member 61*b* interconnecting the distal ends of the arms 61*a* in the transverse directions of the vehicle 1, and a joint 61*c* projecting forwardly from a central portion of the tubular member 61*b*.

The first link 61 is angularly movably mounted on the bottom member 34 by a joint shaft 61*d* that extends in the transverse directions of the vehicle 1.

As depicted in FIG. 8, the second link 62 includes a pair of left and right arms 62*a* extending rearwardly over the bottom bridge 49 from the respective left and right ends of the tubular swing-assembly-side link joint 49*a* of the bottom bridge 49, and a cross member 62*b* interconnecting the arms 62 in the transverse directions of the vehicle 1.

The second link 62 is angularly movably mounted on the tubular swing-assembly-side link joint 49*a* by a joint shaft 62*c* that extends in the transverse directions of the vehicle 1.

The arms 62*a* of the second link 62 have respective distal ends overlapping the tubular member 61*b* of the first link 61 from outside in the transverse directions of the vehicle 1. The distal ends of the arms 62*a* are angularly movably mounted on the first link 61 by a joint shaft 62*d* that is inserted through the distal ends of the arms 62*a* and the tubular member 61*b*.

The third link 63 has an upper end angularly movably mounted on the screw-mechanism-side link joint 52*c* by a joint shaft 63*a* that extends in the transverse directions of the vehicle 1. The third link 63 has a lower end angularly movably mounted on the joint 61*c* of the first link 61 by a joint shaft 63*b* that extends in the transverse directions of the vehicle 1.

Figure 10:
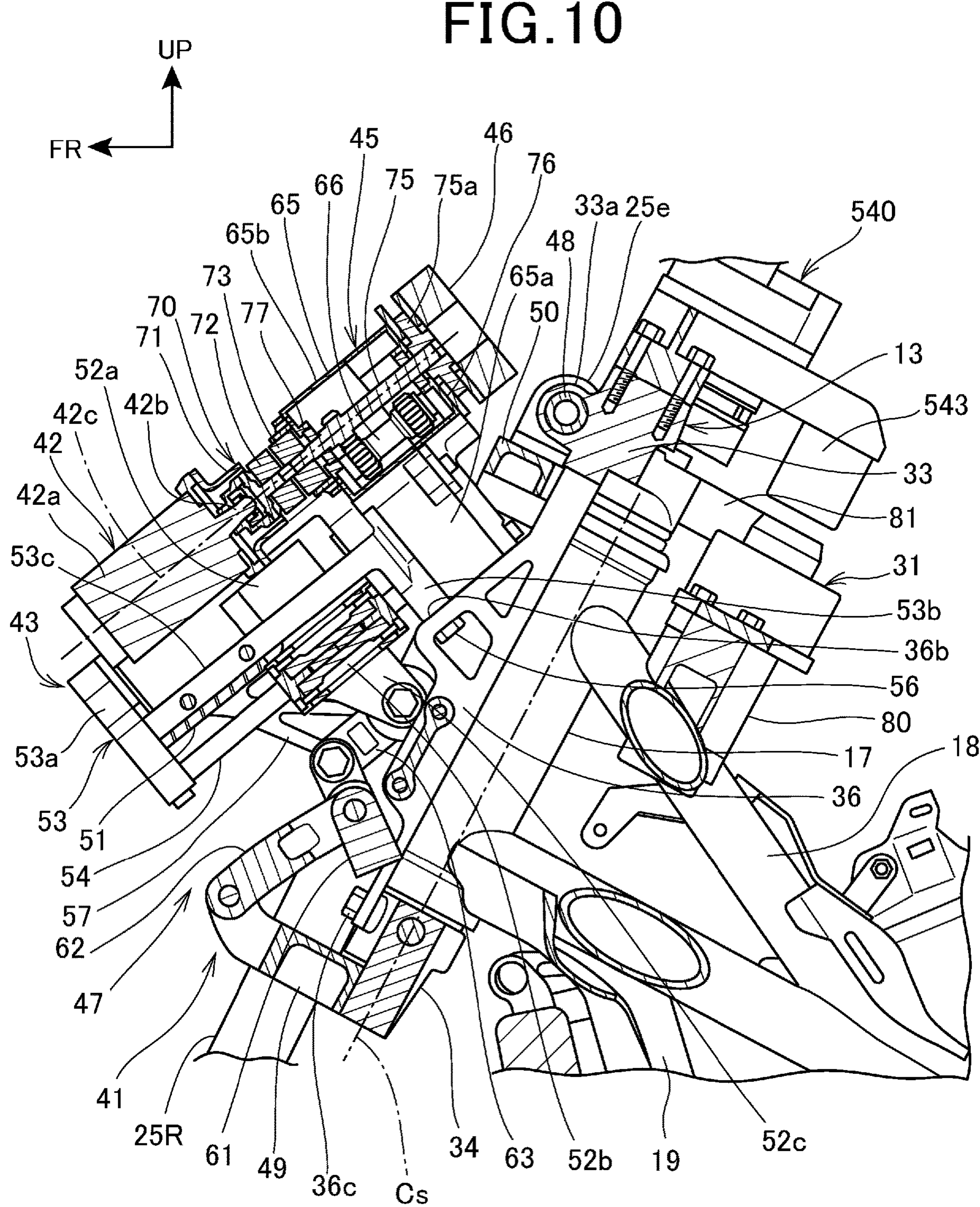
FIG. 10 is a cross-sectional view taken along line X-X of FIG. 5.

FIG. 10 is a cross-sectional view taken along line X-X of FIG. 5.

As depicted in FIGS. 5 through 10, the speed reducer 45 includes a box-shaped speed reducer case 65 and a first transmission shaft 66 and a second transmission shaft 67 that are supported by and housed in the speed reducer case 65.

The speed reducer 45 is mounted on an upper surface of the ball screw mechanism 43. Specifically, the speed reducer case 65 of the speed reducer 45 has a lower surface fixed to an upper wall 53*b* of the ball screw mechanism 43. In other words, the speed reducer 45 is supported on the bracket 36 by the ball screw mechanism 43.

As viewed in side elevation in FIG. 6, etc., the speed reducer case 65 extends forwardly and upwardly along the upper wall 53*b*.

The speed reducer case 65 includes a screw-mechanism-side case member 65*a* fixed to the upper wall 53*b* of the ball screw mechanism 43 and a motor-side case member 65*b* extending forwardly and outwardly in a transverse direction of the vehicle 1 from the screw-mechanism-side case member 65*a*, the case members 65*a*, 65*b* being integral with each other.

The first transmission shaft 66 is held in mesh with the second transmission shaft 67 through intermeshing gears. The first transmission shaft 66 and the second transmission shaft 67 are disposed parallel to the screw shaft 51 of the ball screw mechanism 43, and are inclined rearwardly. The second transmission shaft 67 has a gear held in mesh with the input gear 51*b* provided on the other end 51*a* of the screw shaft 51 of the ball screw mechanism 43. The other end 51*a* of the screw shaft 51 and the input gear 51*b* are housed in the screw-mechanism-side case member 65*a*.

The electric motor 42 is mounted on the speed reducer 45 by a coupling unit 70 serving as a shaft coupling.

The coupling unit 70 includes a tubular case 71 and a drive coupling member 72 and a driven coupling member 73 that are housed in the case 71.

The case 71 has an upper end fixed to a lower surface of the motor-side case member 65*b*, and extends substantially parallel to the screw shaft 51.

The electric motor 42 includes a motor body 42*a* housing a rotor, etc. therein and a rotational shaft 42*b* as the output shaft of the electric motor 42. The electric motor 42 is shaped as a column that is elongate along a central axis 42*c* of the rotational shaft 42*b*.

The electric motor 42 is disposed such that the rotational shaft 42*b* enters the case 71 from below and the motor body 42*a* is fixed to the lower end of the case 71. In other words, the electric motor 42 is attached to the steering swivel unit 13 on the vehicle body 10 through the coupling unit 70, the speed reducer case 65, the ball screw mechanism 43, and the bracket 36.

With the electric motor 42 fixed to the case 71, the axis 42*c* of the rotational shaft 42*b* lies parallel to the screw shaft 51 of the ball screw mechanism 43. As viewed in side elevation in FIG. 10, the axis 42*c* is oriented in the vertical directions of the vehicle 1 in a posture inclined rearwardly from the vertical directions at a larger angle than the steering axis Cs.

The electric motor 42 that is provided as suspended downwardly from the motor-side case member 65*b* is disposed in a position offset forwardly from the ball screw mechanism 43 and laterally from the ball screw mechanism 43. As viewed in front elevation in FIG. 5, the electric motor 42 is positioned between the left and right front fork legs 25L and 25R.

The drive coupling member 72 and the driven coupling member 73 connect the rotational shaft 42*b* of the electric motor 42 to an input shaft 75 (FIG. 10) housed in the motor-side case member 65*b* of the speed reducer 45.

The input shaft 75 is coaxial with the axis 42*c* of the rotational shaft 42*b* of the electric motor 42, and lies parallel to the rotational shaft 42*b* and the screw shaft 51.

The input shaft 75 is held in mesh with the first transmission shaft 66 of the speed reducer 45 through intermeshing gears. The input shaft 75 has an upper end supported on an upper wall 76 of the motor-side case 65*b* by a bearing, and a lower end supported on a lower wall 77 of the motor-side case 65*b* by a bearing.

The input shaft 75 has a lower end projecting downwardly from the motor-side case member 65*b* and connected to the driven coupling member 73.

The drive coupling member 72 is connected to the upper end of the rotational shaft 42*b* of the electric motor 42. The drive coupling member 72 is connected to the driven coupling member 73.

The lock mechanism 46 includes an electromagnetic clutch disposed coaxially with the axis 42*c* of the rotational shaft 42*b*.

The input shaft 75 has on its upper end a lock member 75*a* (FIG. 10) positioned over the upper wall 76 of the motor-side case member 65*b*. The lock mechanism 46 is mounted on an upper surface of the upper wall 76 of the motor-side case member 65*b*.

When an electromagnet of the lock mechanism 46 is not energized, its plunger is biased by a biasing member into engagement with the lock member 75*a* of the input shaft 75, preventing the input shaft 75 from rotating about its own axis. When the electromagnet of the lock mechanism 46 is energized, the plunger is actuated by magnetic forces of the electromagnet out of engagement with the lock member 75*a* of the input shaft 75 against the bias of the biasing member, allowing the input shaft 75 to rotate about its own axis.

In other words, when the electromagnet of the lock mechanism 46 is de-energized, the input shaft 75 is not rotatable about its own axis, making the rotational shaft 42*b* of the electric motor 42 non-rotatable. When the electromagnet of the lock mechanism 46 is energized, the input shaft 75 is rotatable about its own axis, making the rotational shaft 42*b* of the electric motor 42 rotatable.

The vehicle 1 is provided with an automatic steering mechanism 31 (steering mechanism) for actuating the steering swivel unit 13 to steer the front wheel 2.

The automatic steering mechanism 31 includes a steering motor 80 (drive source) as a steering drive source and a steering link 81 (link) as a drive power transmitting member for transmitting drive power from the steering motor 80 to the steering swivel unit 13.

The steering motor 80 is supported on the main frame 18 behind the head pipe 17.

The steering link 81 extends forwardly from a rotational shaft 80*a* of the steering motor 80 alongside the head pipe 17, and is coupled to the top bridge 33 of the steering swivel unit 13.

Figure 11:
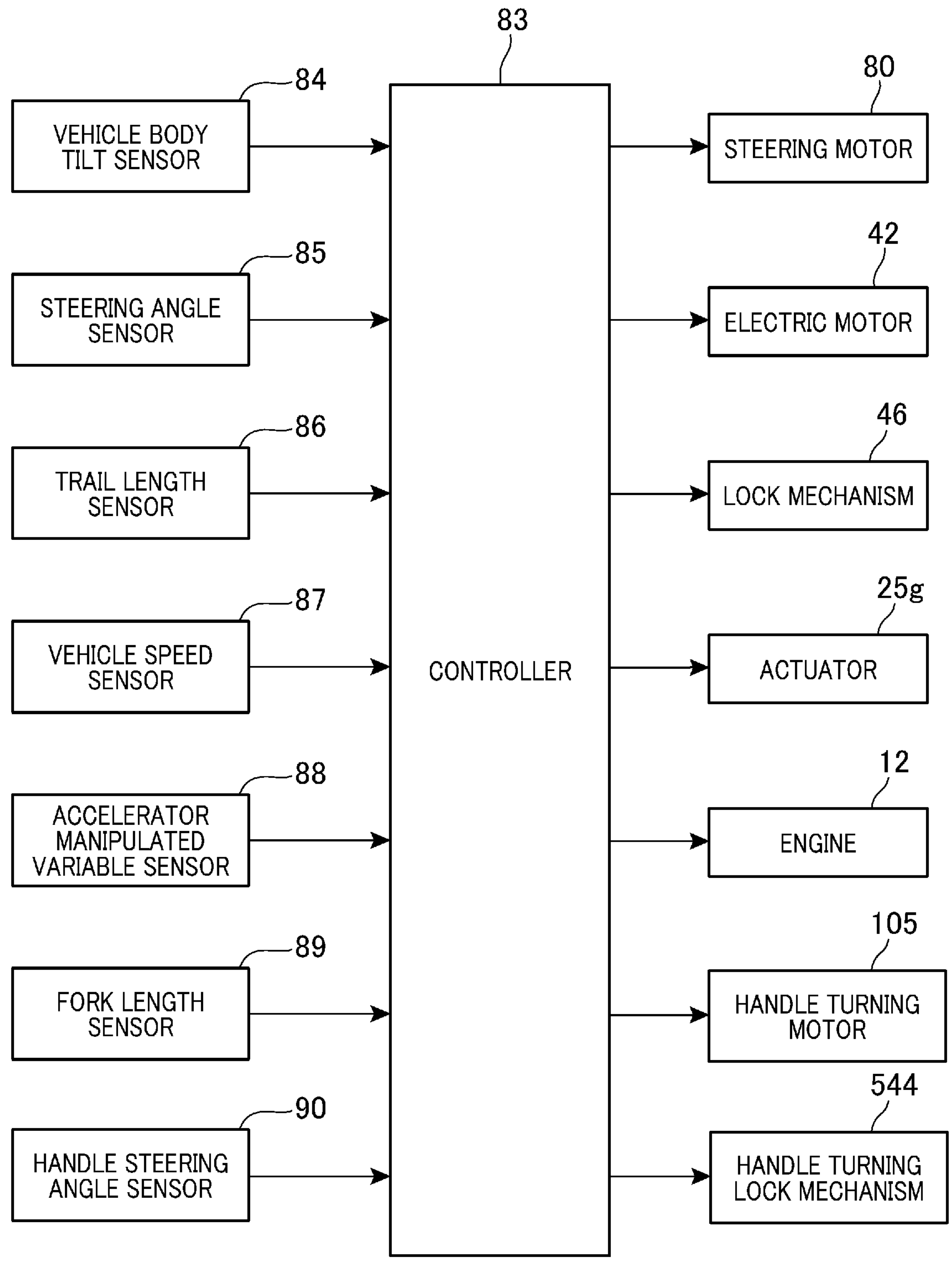
FIG. 11 is a block diagram depicting an arrangement for controlling the vehicle.

FIG. 11 is a block diagram depicting an arrangement for controlling the vehicle 1.

As depicted in FIG. 11, the vehicle 1 includes a controller 83 for performing a control process for controlling operation of the steering motor 80, the electric motor 42 of the trail-length changing mechanism 30, the lock mechanism 46, the actuators 25*g* provided in the respective front fork legs 25L and 25R, the engine 12, a handle turning motor 105 to be described later, and a handle turning lock mechanism 544 (lock mechanism) to be described later.

The vehicle 1 also has sensors for detecting various state quantities required for the control process performed by the controller 83. These sensors include a vehicle body tilt sensor 84 for detecting a tilt angle of the vehicle body 10 in the rolling directions thereof, a steering angle sensor 85 for detecting a steering angle of the front wheel 2 about the steering axis Cs, a trail length sensor 86 for detecting the trail length t, a vehicle speed sensor 87 for detecting a speed at which the vehicle 1 travels, an accelerator manipulated variable sensor 88 for detecting a manipulated variable of an accelerator grip on the steering handle 26, a fork length sensor 89 for detecting an axial length of the front fork legs 25L and 25R, and a handle steering angle sensor 90 for detecting a steering angle of the steering handle 26.

The controller 83 includes an electronic circuit unit including a CPU, a RAM, a ROM, and an interface circuit, etc., and is mounted on the vehicle 1. The sensors 84 through 90 referred to above are connected to the controller 83, and supply their output signals (detected signals) to the controller 83.

The controller 83 controls the engine 12 to operate to propel the vehicle 1 on the basis of an output signal from the accelerator manipulated variable sensor 88.

When the electric motor 42 is energized by the controller 83, the trail-length changing mechanism 30 operates to change the trail length t.

Specifically, the rotation of the rotational shaft 42*b* of the electric motor 42 is transmitted therefrom successively through the drive coupling member 72 and the driven coupling member 73, the input shaft 75, the first transmission shaft 66 and the second transmission shaft 67 of the speed reducer 45, and the input gear 51*b* to the screw shaft 51 of the ball screw mechanism 43.

At this time, the rotation of the electric motor 42 is largely reduced in speed by the speed reducer 45 before being transmitted to the screw shaft 51.

The screw shaft 51 is thus rotated about its own axis by the electric motor 42, causing the nut member 52 to move linearly on the screw shaft 51 along the guide member 54.

The movement of the nut member 52 on the screw shaft 51 deforms the link mechanism 47, causing the bottom bridge 49 coupled to the second link 62 to move in a longitudinal direction of the vehicle 1.

When the bottom bridge 49 is moved in the longitudinal direction of the vehicle 1, the front fork legs 25L and 25R are turned in the longitudinal direction of the vehicle 1 about the swing shaft 48, thereby changing the trail length t.

In the "normal state" depicted in FIG. 6, the nut member 52 has been displaced upwardly in abutment against the upper wall 53*b* of the housing 53 by energizing the electric motor 42. The joint shaft 62*d* of the second link 62 has been lifted upwardly, rearwardly displacing the joint shaft 62*c* at the front end of the second link 62 to cause the bottom bridge 49 to turn the front fork legs 25L and 25R rearwardly. The "normal state" is a state where the trail length t is set to have the front wheel 2 in its rearmost position.

In the "normal state," the bottom bridge 49 has its rear surface held in abutment against the front surface of the bottom member 34 thereby to prevent the front fork legs 25L and 25R from swinging further rearwardly.

In the "normal state," moreover, the controller 83 does not energize the lock mechanism 46, which locks the rotational shaft 42*b* of the electric motor 42 against rotation. Therefore, the lock mechanism 46 also locks the nut member 52 against movement on the screw shaft 51, thereby locking the front fork legs 25L and 25R against swinging movement. Consequently, the front fork legs 25L and 25R are prevented from changing from the "normal state" to the "trail-length-changed state" under external forces applied from the road, etc. to the vehicle 1.

If rotation is transmitted from the ball screw mechanism 43 via the speed reducer 45 to the electric motor 42, then the rotation is accelerated by the speed reducer 45, and hence the torque from the ball screw mechanism 43 is reduced by the speed reducer 45 before being transmitted to the input shaft 75.

According to the first embodiment, with respect to the path along which the rotation is transmitted from the electric motor 42, the lock mechanism 46 is disposed on the input shaft 75 upstream of the first transmission shaft 66 of the speed reducer 45. With this layout, even if the nut member 52 is to move downwardly from the "normal state," the torque that is transmitted from the ball screw mechanism 43 to the input shaft 75 is small. Therefore, the lock mechanism 46 is able to prevent the front fork legs 25L and 25R from swinging with a reduced locking capability.

In the "trail-length-changed state" depicted in FIG. 7, the nut member 52 has been displaced downwardly in abutment against the lower wall 53*a* of the housing 53 by energizing the electric motor 42. The joint shaft 62*d* of the second link 62 has been lowered downwardly, forwardly displacing the joint shaft 62*c* at the front end of the second link 62 to cause the bottom bridge 49 to turn the front fork legs 25L and 25R forwardly.

In the "trail-length changed state," moreover, the controller 83 does not energize the lock mechanism 46, which locks the rotational shaft 42*b* of the electric motor 42 against rotation. Therefore, the lock mechanism 46 also locks the nut member 52 against movement on the screw shaft 51, thereby locking the front fork legs 25L and 25R against swinging movement. Consequently, the front fork legs 25L and 25R are prevented from changing from the "trail-length-changed state" to the "normal state" under external forces applied from the road, etc. to the vehicle 1.

According to the first embodiment, the electric motor 42 is supported on the steering swivel unit 13 on the vehicle body 10 through the speed reducer 45, the ball screw mechanism 43, and the bracket 36. Therefore, the electric motor 42 can be located in the vicinity of the steering axis Cs. The steering inertia of the steering swivel unit 13 is thus lowered, making it easy for the steering swivel unit 13 to steer the front wheel 2.

The front fork legs 25L and 25R are swingable about the steering shaft 48 that is disposed in a position aligned with the fork leg axis 25*a* as viewed in side elevation. Therefore, the inertial mass of the front fork legs 25L and 25R at the time they swing is reduced. Consequently, the front fork legs 25L and 25R can swing under small drive forces and rapidly to change the trail length t quickly.

An example of operation of the trail-length changing mechanism 30, the automatic steering mechanism 31, and the front fork legs 25L and 25R will be described below.

If the vehicle speed detected by the vehicle speed sensor 87 is in excess of a predetermined speed (e.g., 4 kilometers per hour), the controller 83 keeps the vehicle 1 in the "normal state." While the vehicle 1 is traveling in the "normal state," the controller 83 does not energize the lock mechanism 46, thereby locking the front fork legs 25L and 25R against swinging movement. In the "normal state," the controller 83 reduces the controlled variable for the steering motor 80 of the automatic steering mechanism 31. In the "normal state," therefore, the rider steers the front wheel 2 through the steering handle 26.

If the vehicle speed detected by the vehicle speed sensor 87 is equal to or lower than a predetermined speed (e.g., 3 kilometers per hour) including an at-rest state (0 kilometer per hour), then the controller 83 brings the vehicle 1 into the "trail-length-changed state."

Initially, the controller 83 actuates the lock mechanism 46 while in the "normal state" to unlock the front fork legs 25L and 25R for swinging movement. Then, the controller 83 energizes the electric motor 42 to turn the front fork legs 25L and 25R forwardly about the swing shaft 48, bringing the vehicle 1 into the "trail-length-changed state." Thereafter, the controller 83 stops energizing the lock mechanism 46, preventing the front fork legs 25L and 25R from swinging.

In the "trail-length-changed state," the controller 83 increases the controlled variable for the steering motor 80 and steers the front wheel 2. Specifically, based on output signals from the vehicle body tilt sensor 84 and the steering angle sensor 85, the controller 83 energizes the steering motor 80 so that the vehicle 1 can stand on its own in an upright state, i.e., the tilt angle detected by the vehicle body tilt sensor 84 is zero. In the "trail-length-changed state," as described above, when the front wheel 2 is steered, the center CG of gravity moves in the opposite direction to the steered direction, producing a force F (FIG. 4B) in a direction to keep the vehicle body 10 upright. By energizing the steering motor 80 in a direction to steer the vehicle 1 in the direction to cause the vehicle body 10 to fall over, the controller 83 is able to make the vehicle 1 stand on its own.

In the "trail-length-changed state," therefore, as the vehicle 1 stands on its own under the control of the controller 83, the vehicle 1 keeps itself upright without being supported by a stand or the rider even when the vehicle 1 is at rest.

In the "trail-length-changed state" and the "normal state," the controller 83 operates the actuators 25*g* of the front fork legs 25L and 25R on the basis of an output signal from the fork length sensor 89 to adjust the axial lengths of the front fork legs 25L and 25R in order to reduce changes in the height of the vehicle 1.

Specifically, when the vehicle 1 changes from the "normal state" to the "trail-length-changed state," the height of the vehicle 1 is lowered because the front fork legs 25L and 25R are tilted further rearwardly. Therefore, even when the vehicle 1 changes to the "trail-length-changed state," in order to keep the same height of the vehicle 1 as in the "normal state," the controller 83 operates the actuators 25*g* to increase the overall lengths of the front fork legs 25L and 25R. In this manner, any change in the maneuverability of the vehicle 1 due to a change in the trail length t is minimized.

The automatic steering mechanism 31 will be described in detail below.

Figure 12:
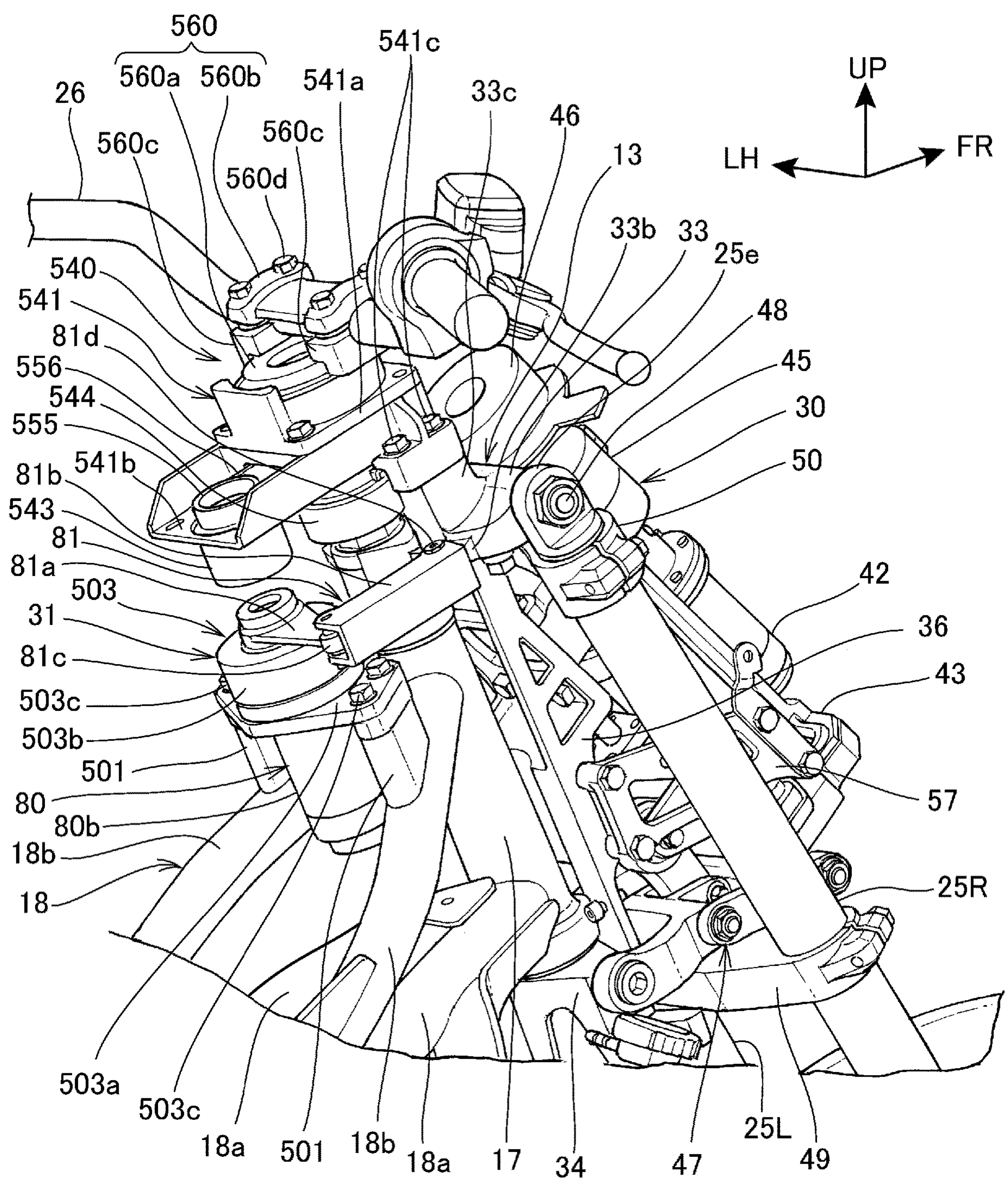
FIG. 12 is a perspective view of a steering swivel unit and peripheral parts as viewed from a rear right viewpoint.
Figure 13:
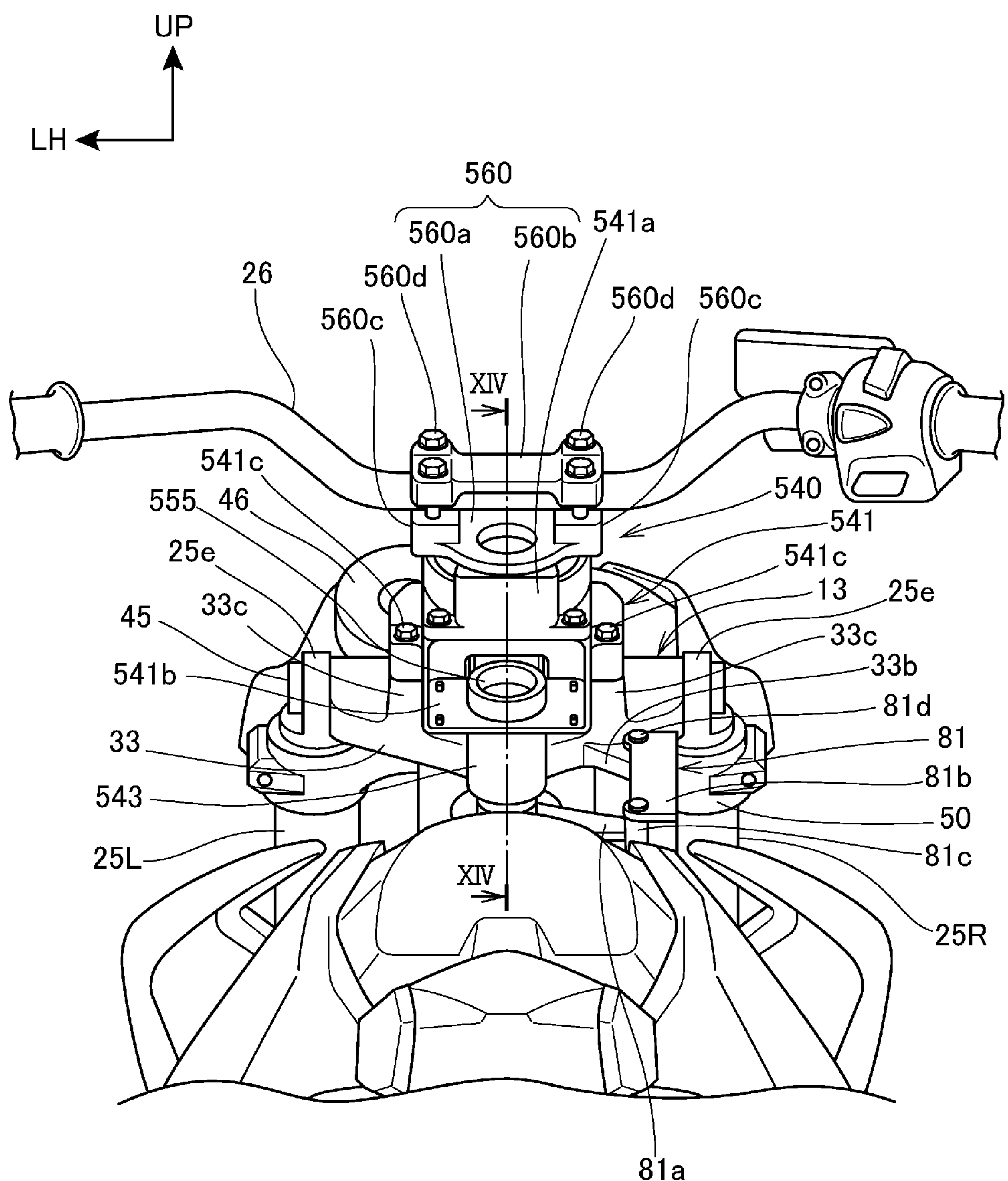
FIG. 13 is a rear elevational view of an upper portion of the steering swivel unit, a steering handle, and peripheral prats as viewed from a rear viewpoint.
Figure 14:
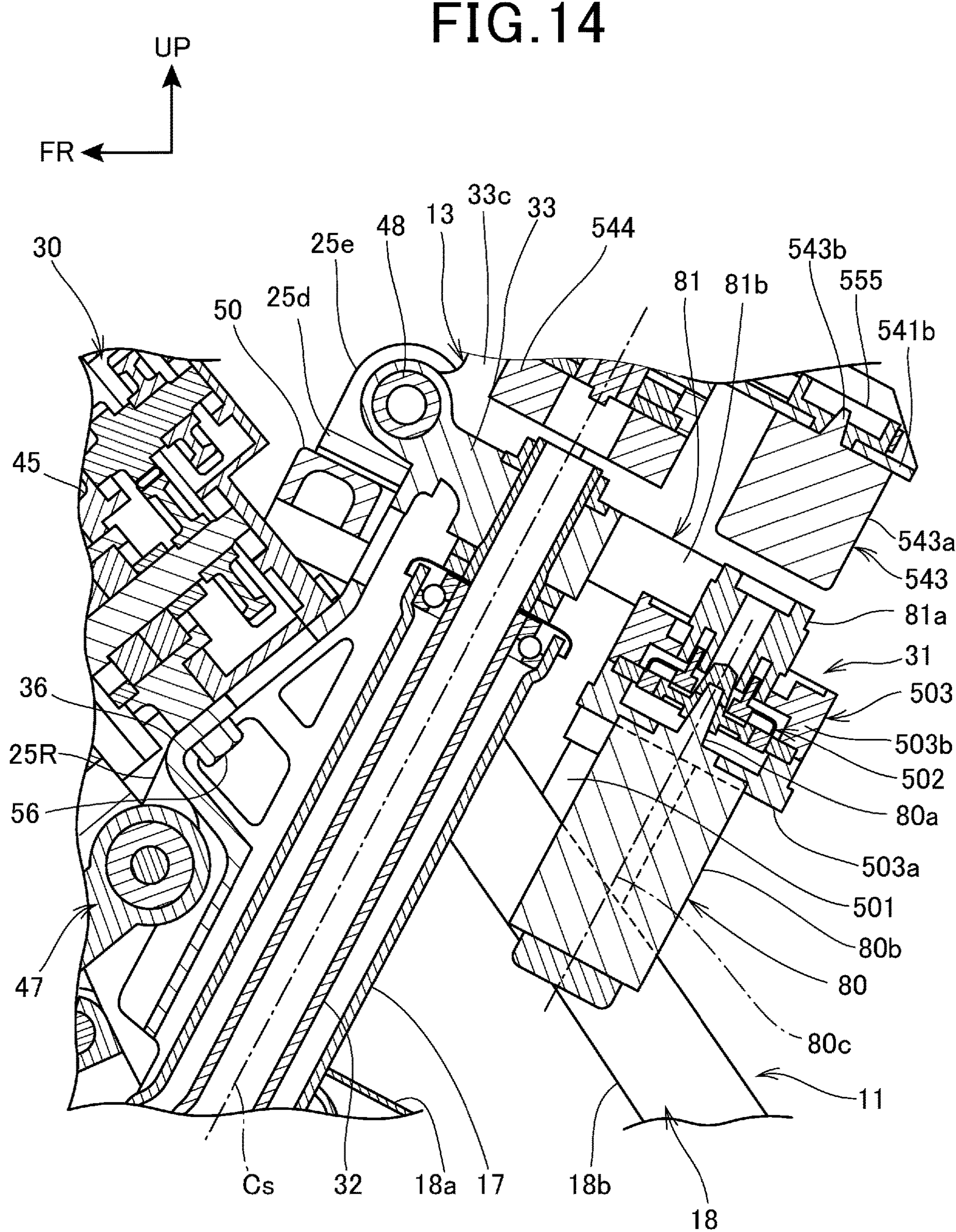
FIG. 14 is a cross-sectional view taken along line XIV-XIV of FIG. 13, depicting the steering swivel unit and peripheral parts in cross-section.

FIG. 12 is a perspective view of the steering swivel unit 13 and peripheral parts as viewed from a rear right viewpoint. FIG. 13 is a rear elevational view of an upper portion of the steering swivel unit 13, the steering handle 26, and peripheral prats as viewed from a rear viewpoint. FIG. 14 is a cross-sectional view taken along line XIV-XIV of FIG. 13, depicting the steering swivel unit 13 and peripheral parts in cross-section.

As depicted in FIGS. 1 and 12, the main frame 18 includes a pair of left and right lower frames 18*a* extending rearwardly from a lower portion of the head pipe 17 and coupled to the pivot frame 20, and a pair of left and right upper frames 18*b* extending rearwardly and downwardly from an upper portion of the head pipe 17 and coupled to respective upper surfaces of front portions of the lower frames 18*a*. The upper frames 18*b* and the lower frames 18*a* are in the form of a pipe.

The left and right upper frames 18*b* are spaced apart from each other by a progressively larger distance transversely across the vehicle 1 in a rearward direction away from the rear surface of the head pipe 17.

A pair of left and right upward extensions 501 are provided respectively on the upper frames 18*b* and extend upwardly from respective upper surfaces of the upper frames 18*b*. The upward extensions 501 are in the form of blocks extending vertically substantially parallel to the steering axis Cs as viewed in side elevation. The upward extensions 501 are spaced rearwardly from the rear surface of head pipe 17. The upward extensions 501 are provided along the respective upper frames 18*b*, so that the distance between the upward extensions 501 transversely across the vehicle 1 is progressively larger in the rearward direction.

As depicted in FIGS. 12 through 14, the automatic steering mechanism 31 includes the steering motor 80, which includes an electric motor, a speed reducer 502 for reducing the speed of rotation of the steering motor 80, a housing 503 (cross member) housing the speed reducer 502 therein, and the steering link 81.

The housing 503 includes a base 503*a* fixed to the upward extensions 501 on the upper frames 18*b* and interconnecting the upward extensions 501 in the transverse directions of the vehicle 1, and a tubular casing 503*b* extending upwardly from a transversely central portion of the base 503*a*.

The housing 503 is mounted on the upper frames 18*b* with the base 503*a* fixed to respective upper surfaces of the upward extensions 501. Specifically, the base 503*a* is fastened to the upper surfaces of the upward extensions 501 by bolts 503*c* that are inserted from above into transversely opposite ends of the base 503*a* and threaded into the upper extensions 501.

The steering motor 80 includes a motor body 80*b* housing a rotor, etc. therein and a rotational shaft 80*a* as the output shaft of the steering motor 80. The steering motor 80 is shaped as a column that is elongate along a central axis 80*c* of the rotational shaft 80*a*.

The steering motor 80 is mounted on the housing 503 such that the rotational shaft 80*a* enters the housing 503 from below and the motor body 80*b* is fixed to the lower end of the base 503*a*. In other words, the steering motor 80 is supported on the main frame 18 through the housing 503 and the upward extensions 501.

The steering motor 80 is fixed in place such that the axis 80*c* thereof lies parallel to the steering axis Cs as viewed in side elevation and is oriented vertically. The steering motor 80 is disposed such that the axis 80*c* thereof lies parallel to the head pipe 17 as viewed in side elevation.

The steering motor 80 is disposed centrally in the transverse directions of the vehicle 1 behind the head pipe 17, and positioned between the left and right upper frames 18*b* in the transverse directions of the vehicle 1. Specifically, the steering motor 80 is provided as suspended downwardly from the housing 503, and the motor body 80*b* is positioned in a space between the left and right upward extensions 501. The motor body 80*b* has a lower portion positioned in a space between the upper frames 18*b*. The motor body 80*b* is provided in overlapping relation to the upward extensions 501 and the upper frames 18*b* as viewed in side elevation, and has its left and right side portions covered with the upward extensions 501 and the upper frames 18*b*.

The steering motor 80 thus covered with the upward extensions 501 and the upper frames 18*b* is protected thereby and concealed for a better appearance. As the steering motor 80 is disposed centrally in the transverse directions of the vehicle 1, it allows the vehicle 1 to have a good weight balance in the transverse directions of the vehicle 1.

The speed reducer 502 is disposed in the casing 503*b* of the housing 503. The rotational shaft 80*a* of the steering motor 80 is connected to an input component of the speed reducer 502, whose output component is connected to the steering link 81.

The speed reducer 502 includes a wave gearing device disposed coaxially with the axis 80*c* of the rotational shaft 80*a*, and provides a high speed reduction ratio. The speed reducer 502 may be a speed reducer called "Harmonic Drive" (registered trademark), for example.

The steering link 81 includes a turn arm 81*a* connected to the output component of the speed reducer 502, a joint arm 81*b* interconnecting the turn arm 81*a* and the top bridge 33, a joint shaft 81*c* connecting the turn arm 81*a* and the joint arm 81*b* angularly movably to each other, and a joint shaft 81*d* connecting the joint arm 81*b* and the top bridge 33 angularly movably to each other.

The turn arm 81*a* extends from an upper surface of the housing 503 transversely to one side (the right), and is angularly movable by the steering motor 80 through the speed reducer 502.

The joint arm 81*b* has a rear end coupled to an outer end of the turn arm 81*a* by the joint shaft 81*c*. The joint arm 81*b* extends in the longitudinal directions of the vehicle 1 at a position that is offset from the head pipe 17 transversely to one side.

The joint arm 81*b* has a front end coupled to the top bridge 33 by the joint shaft 81*d*. Specifically, the top bridge 33 has a connector 33*b* at a position offset from the head pipe 17 transversely to one side (the right), and the joint arm 81*b* is coupled to the connector 33*b* by the joint shaft 81*d*.

The steering link 81 is a link movable about axes that are provided by the shaft about which the turn arm 81*a* is angularly movable, the joint shaft 81*c*, the joint shaft 81*d*, and the steering axis Cs.

Since the steering motor 80 extends upwardly from the upper frames 18*b* in the vicinity of the rear surface of the head pipe 17, the steering motor 80 is close to the top bridge 33 that is positioned above the head pipe 17. Therefore, the steering motor 80 can easily be connected to the top bridge 33 by the steering link 81.

Figure 15:
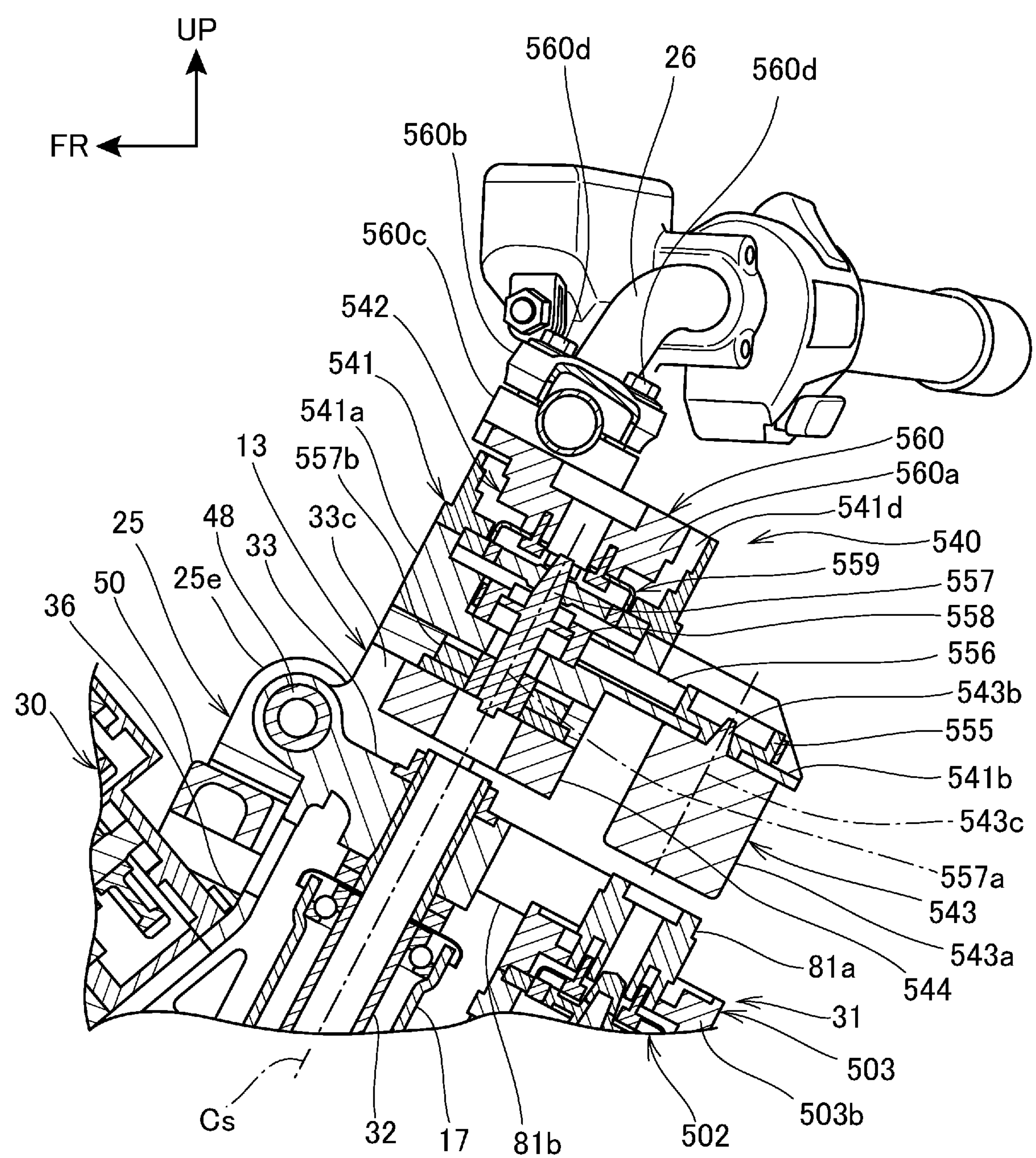
FIG. 15 is a cross-sectional view taken along line XIV-XIV of FIG. 13, depicting the steering handle and peripheral parts in cross-section.

FIG. 15 is a cross-sectional view taken along line XIV-XIV of FIG. 13, depicting the steering handle 26 and peripheral parts in cross-section.

The vehicle 1 includes a steering handle turning mechanism 540 that turns the steering handle 26 about the steering axis Cs with respect to the steering swivel unit 13.

As depicted in FIGS. 12 through 15, the steering handle turning mechanism 540 is provided on the upper surface of the top bridge 33.

The steering handle turning mechanism 540 includes a case 541 mounted on the upper surface of the top bridge 33, a rotor 542 housed in the case 541, a handle turning motor 543 (handle drive source) for actuating the rotor 542, and a handle turning lock mechanism 544 for locking (limiting) the rotor 542 against rotation.

The steering handle turning mechanism 540 also includes a drive pulley 555 provided coaxially with the handle turning motor 543 and a belt-like power transmitting member 556 operatively interconnecting the drive pulley 555 and the rotor 542.

The top bridge 33 has a pair of left and right supports 33*c* projecting upwardly from an upper surface thereof. The left and right supports 33*c* are disposed in respective left and right positions one on each side of the steering shaft 32.

The case 541 includes a box-shaped case body 541*a* and a plate-like rearward extension 541*b* extending rearwardly from a rear surface of the case body 541*a*. The rearward extension 541*b* is inclined rearwardly and downwardly perpendicularly to the steering axis Cs.

The case 541 is disposed such that the case body 541*a* has a bottom surface placed on upper surfaces of the left and right supports 33*c* and interconnecting the supports 33*c* in the transverse directions of the vehicle 1.

The case 51 is fastened to the supports 33*c* by case fastening bolts 541*c* that are threaded from above into the case body 541*a*.

The rotor 542 is housed in the case body 541*a*.

The rotor 542 includes a turn shaft 557 angularly movably supported in the case body 541*a*, a driven pulley 558 fixed to the turn shaft 557, a speed reducer 559 connected to the upper end of the turn shaft 557, and a handle holder 560 connected to the speed reducer 559.

The turn shaft 557 has a central axis 557*a* about which the rotor 542 is rotatable. The turn shaft 557 is positioned above the steering shaft 32 and coaxially with the steering axis Cs, with the central axis 557*a* being oriented vertically.

The driven pulley 558 is operatively connected to the drive pulley 555 through the power transmitting member 556.

The turn shaft 557 has an upper end connected to an input component of the speed reducer 559. The speed reducer 559 has an output component connected to the handle holder 560.

The speed reducer 559 includes a wave gearing device disposed coaxially with the axis 557*a* of the turn shaft 557, and provides a high speed reduction ratio. The speed reducer 559 may be a speed reducer called "Harmonic Drive" (registered trademark), for example.

The handle holder 560 is exposed upwardly through an opening 541*d* (FIG. 15) defined in an upper portion of the case body 541*a*. The handle holder 560 includes a base 560*a* connected to the output component of the speed reducer 559 and a cap 560*b* fixed to an upper portion of the base 560*a*.

The steering handle 26 is fixed to the handle holder 560 by having a transverse central portion thereof sandwiched between the cap 560*b* and the base 560*a*.

The handle turning lock mechanism 544 is mounted on a lower surface of the case body 541*a*. The handle turning lock mechanism 544 is positioned between the left and right supports 33*c* and above the steering shaft 32. The handle turning lock mechanism 544 is thus provided compactly in a space between the steering shaft 32 and the case body 541*a*.

The handle turning lock mechanism 544, the turn shaft 557, the driven pulley 558, the speed reducer 559, and the handle holder 560 are disposed coaxially with the axis 557*a* of the turn shaft 557, about which the steering handle 26 is angularly movable. Consequently, the rotor 542 and the handle turning lock mechanism 544 are provided in a compact layout.

The handle turning lock mechanism 544 includes an electromagnetic clutch.

The rotor 542 includes a lock member 557*b* (FIG. 15) disposed on the lower end of the turn shaft 557 for angular movement in unison therewith.

When an electromagnet of the handle turning lock mechanism 544 is not energized, its plunger is biased by a biasing member into engagement with the lock member 557*b* of the turn shaft 557, preventing the turn shaft 557 from rotating about its own axis.

When the electromagnet of the handle turning lock mechanism 544 is energized, the plunger is actuated by magnetic forces of the electromagnet out of engagement with the lock member 557*b* against the bias of the biasing member.

Therefore, when the electromagnet of the handle turning lock mechanism 544 is not energized, the turn shaft 557 is non-rotatable, and hence the output shaft of the handle turning motor 543 connected to the turn shaft 557 by the power transmitting member 556, etc. is also non-rotatable. When the electromagnet of the handle turning lock mechanism 544 is energized, the turn shaft 557 is rotatable, and hence the output shaft of the handle turning motor 543 is also rotatable.

The handle turning motor 543 includes a motor body 543*a* housing a rotor, etc. and a rotational shaft 543*b* as the output shaft thereof.

The handle turning motor 543 is disposed such that the rotational shaft 543*b* extends from below through the rearward extension 541*b* of the case 541 and the motor body 543*a* is fixed to a lower surface of the rear extension 541*b*. In other words, the handle turning motor 543 is secured in place such that it is suspended downwardly from the rearward extension 541*b*.

The rotational shaft 543*b* of the handle turning motor 543 has a central axis 543*c* extending parallel to the central axis 557*a* of the turn shaft 557.

The drive pulley 555 is fixed to the rotational shaft 543*b*. The power transmitting member 556 extends forwardly from the drive pulley 555 over an upper surface of the rearward extension 541*b* and is operatively connected to the driven pulley 558.

The handle turning motor 543 is disposed rearwardly of the rotor 542 and beneath the rearward extension 541*b*. The handle turning motor 543 is disposed centrally of the steering handle 26 in the transverse directions of the vehicle 1 and above the steering motor 80. The central axis 543*c* of the handle turning motor 543 is positioned substantially coaxially with the central axis 80*c* of the steering motor 80.

Rotation of the handle turning motor 543 is transmitted therefrom successively through the drive pulley 555, the power transmitting member 556, the driven pulley 558, the turn shaft 557, and the speed reducer 559 to the handle holder 560.

When the handle holder 560 is turned, the steering handle 26 is turned about the central axis 557*a* of the turn shaft 557, i.e., about the steering axis Cs. The steering handle 26 is angularly movable independently of the steering swivel unit 13.

According to the first embodiment, the central axis 557*a* and the steering axis Cs are coaxial with each other. However, even if the central axis 557*a* is displaced out of alignment with the steering axis Cs, the steering handle 26 can be regarded as being angularly movable about the steering axis Cs.

The handle turning lock mechanism 544 is disposed upstream of the speed reducer 559 with respect to the path along which the rotation is transmitted from the handle turning motor 543 to the steering handle 26.

Figure 16:
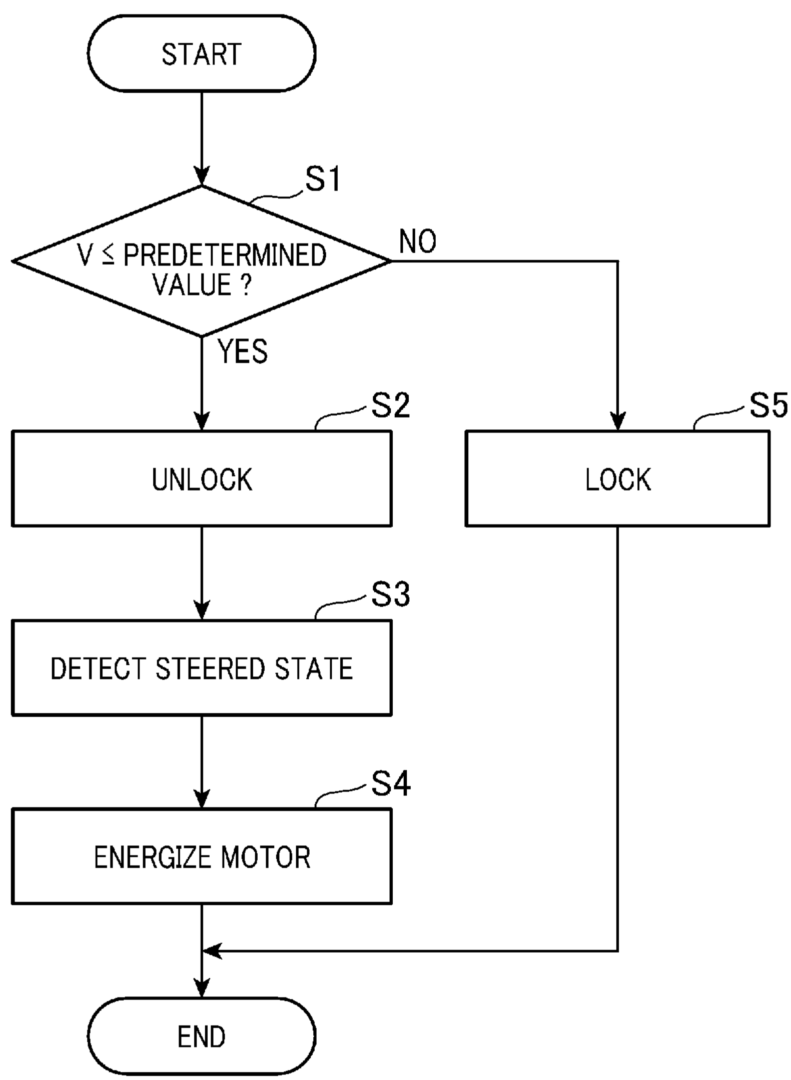
FIG. 16 is a flowchart of a steering handle turn control process.

The controller 83 performs a steering handle turn control process depicted in FIG. 16 for preventing the steering handle 26 from being turned when the front wheel 2 is automatically steered by the automatic steering mechanism 31. The controller 83 performs the steering handle turn control process depicted in FIG. 16 repeatedly at predetermined time intervals.

FIG. 16 is a flowchart of the steering handle turn control process.

As depicted in FIG. 16, the controller 83 initially determines whether or not the vehicle speed V detected by the vehicle speed sensor 87 is equal to or lower than a predetermined speed (e.g., 4 kilometers per hour) (step S1).

If the vehicle speed V is equal to or lower than the predetermined speed including an at-rest state (0 kilometer per hour) (step S1: YES), then the controller 83 actuates the handle turning lock mechanism 544 to unlock the turn shaft 557 locked by the handle turning lock mechanism 544 (step S2). The rotational shaft 543*b* of the handle turning motor 543 is now rotatable.

Then, the controller 83 detects a steered state of the front wheel 2 with the steering angle sensor 85 (step S3). Specifically, in step S3, the steering angle (steering direction) of the front wheel 2 and the angular velocity of steering movement of the front wheel 2 are detected. The steering angle of the front wheel 2 is 0 when the front wheel 2 is directed straight forwardly. The state where the steering handle 26 is not turned to either the left or the right, as depicted in FIG. 13, is referred to as a reference position for the steering angle of the steering handle 26.

Thereafter, the controller 83 energizes the handle tuning motor 543 to turn the steering handle 26 in an opposite direction to the steering direction detected in step S3 (step S4). The steering handle 26 is now turned in an opposite direction to the steering swivel unit 13 that turns in unison with the front wheel 2.

For example, if the front wheel 2 is steered through 5° to the right by the automatic steering mechanism 31, then the controller 83 energizes the handle tuning motor 543 to turn the handle 26 through 5° to the left at the same angular velocity as the angular velocity of the steering movement of the front wheel 2. In this case, though the steering handle 26 is turned relatively to the steering swivel unit 13, the steering handle 26 is not turned with respect to the vehicle frame 11, but stays in the reference position referred to above, and remains essentially still on the steering swivel unit 13. As the steering handle 26 is turned about the central axis 557*a* that is coaxial with the steering axis C2, the steering handle 26 does not move to the left or right.

Accordingly, even when the front wheel 2 is steered by the automatic steering mechanism 31, since the steering handle 26 does not turn with respect to the vehicle frame 11, the steering movement of the front wheel 2 caused by the automatic steering mechanism 31 is prevented from affecting the rider who is gripping the steering handle 26.

Figure 17:
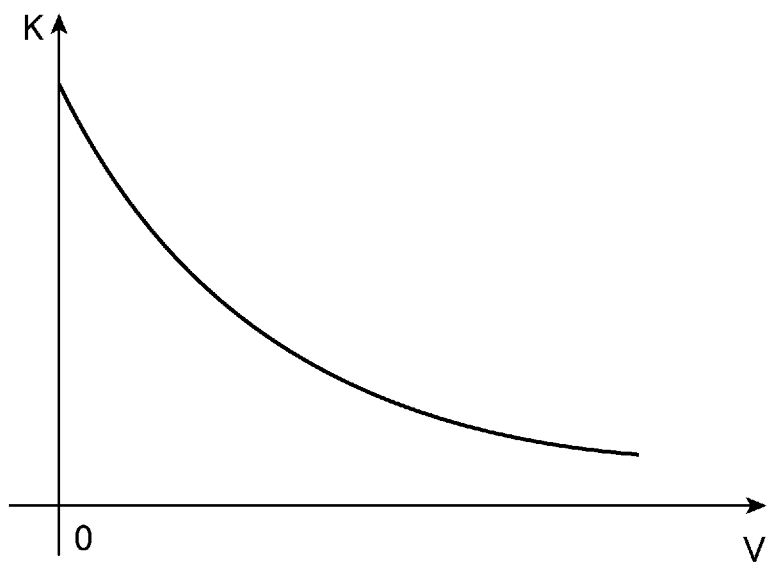
FIG. 17 is a diagram depicting the relationship between the gain of a process of controlling a handle turning motor and the vehicle speed.

FIG. 17 is a diagram depicting the relationship between the gain K of a process of controlling the handle turning motor 543 and the vehicle speed V.

In step S4, the controller 83 determines a current command value (a target value for an energizing current) for the handle turning motor 543 by multiplying the difference between the detected value of the steering angle of the front wheel 2 and a target value for the turned position (steering angle) of the steering handle 26 by a gain K having a predetermined value. Here, the target value for the turned position of the steering handle 26 is 0°.

As depicted in FIG. 17, the gain K is the largest when the vehicle speed V is 0, and becomes progressively smaller as the vehicle speed V goes higher.

Therefore, when the vehicle speed V is smaller, the angle through which the steering handle 26 is turned in the opposite direction to the direction in which the front wheel 2 is steered is larger, and when the vehicle speed V goes higher, the angle through which the steering handle 26 is turned in the opposite direction to the direction in which the front wheel 2 is steered becomes smaller.

For example, when the vehicle speed V is 0 kilometer per hour and the front wheel 2 is steered 10° to the right by the automatic steering mechanism 31, since the gain K is large, the steering handle 26 is steered 10° to the left. In this case, the steering handle 26 remains essentially still, and the steering angle thereof from the reference position is 0°.

When the vehicle speed V is 2 kilometers per hour and the front wheel 2 is steered 10° to the right by the automatic steering mechanism 31, since the gain K is smaller than when the vehicle speed V is 0 kilometer per hour, the steering handle 26 is steered 5° to the left, for example. In this case, the steering handle 26 is turned 5° to the right from the reference position.

According to the first embodiment, as described above, even if the front wheel 2 is steered through the same angle, the angle through which the steering handle 26 is turned in the opposite direction is smaller as the vehicle speed V is higher. Therefore, when the vehicle speed V is low, the steering movement of the front wheel 2 caused by the automatic steering mechanism 31 is prevented from affecting the rider who is gripping the steering handle 26. When the vehicle speed V goes higher, making it easier for the vehicle 1 to be stable, the turning movement of the steering handle 26 allows the rider to recognize the direction in which the front wheel 2 is steered by the automatic steering mechanism 31. Furthermore, since the angle through which the steering handle 26 in the direction in which the front wheel 2 is steered is turned becomes progressively greater as the vehicle speed V increases, the rider finds it easy to drive the vehicle 1.

Referring back to FIG. 16, if the vehicle speed V exceeds the predetermined speed (step S1: NO), then the controller 83 stops energizing the handle turning lock mechanism 544, which locks the turn shaft 557 against turning movement (step S5).

According to the first embodiment, when the vehicle speed V is high and the front wheel 2 is not steered by the automatic steering mechanism 31, the steering handle 26 is directly connected to the top bridge 33 by the handle turning lock mechanism 544. Therefore, the rider is able to steer the front wheel 2 directly through the steering handle 26.

In addition, inasmuch as the handle turning lock mechanism 544 locks the turn shaft 557 when not energized by the controller 83, the rider is able to steer the front wheel 2 directly through the steering handle 26 even though no electric power is supplied.

Figure 18:
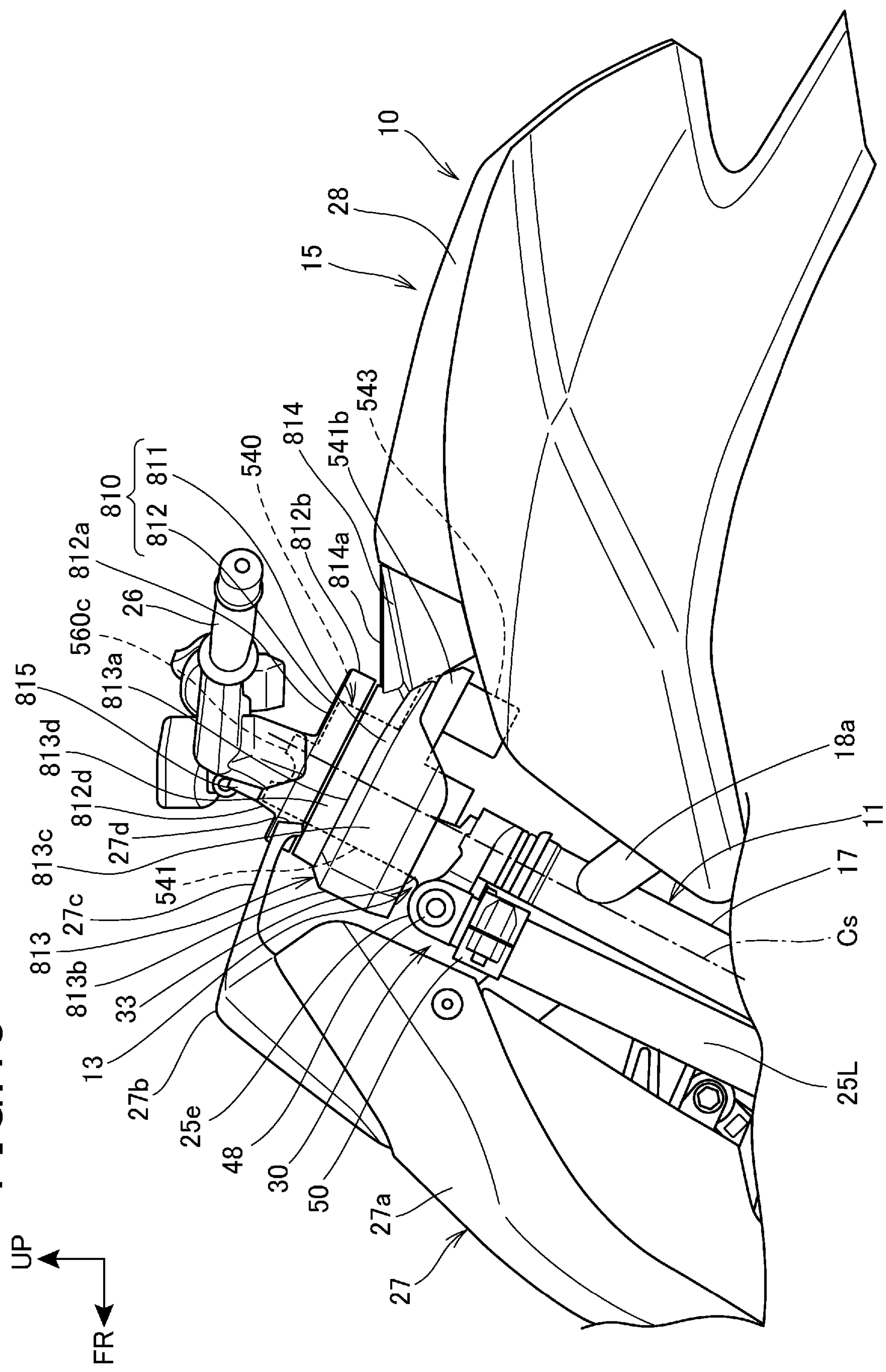
FIG. 18 is a left-hand side elevational view of the steering swivel unit and peripheral parts.
Figure 19:
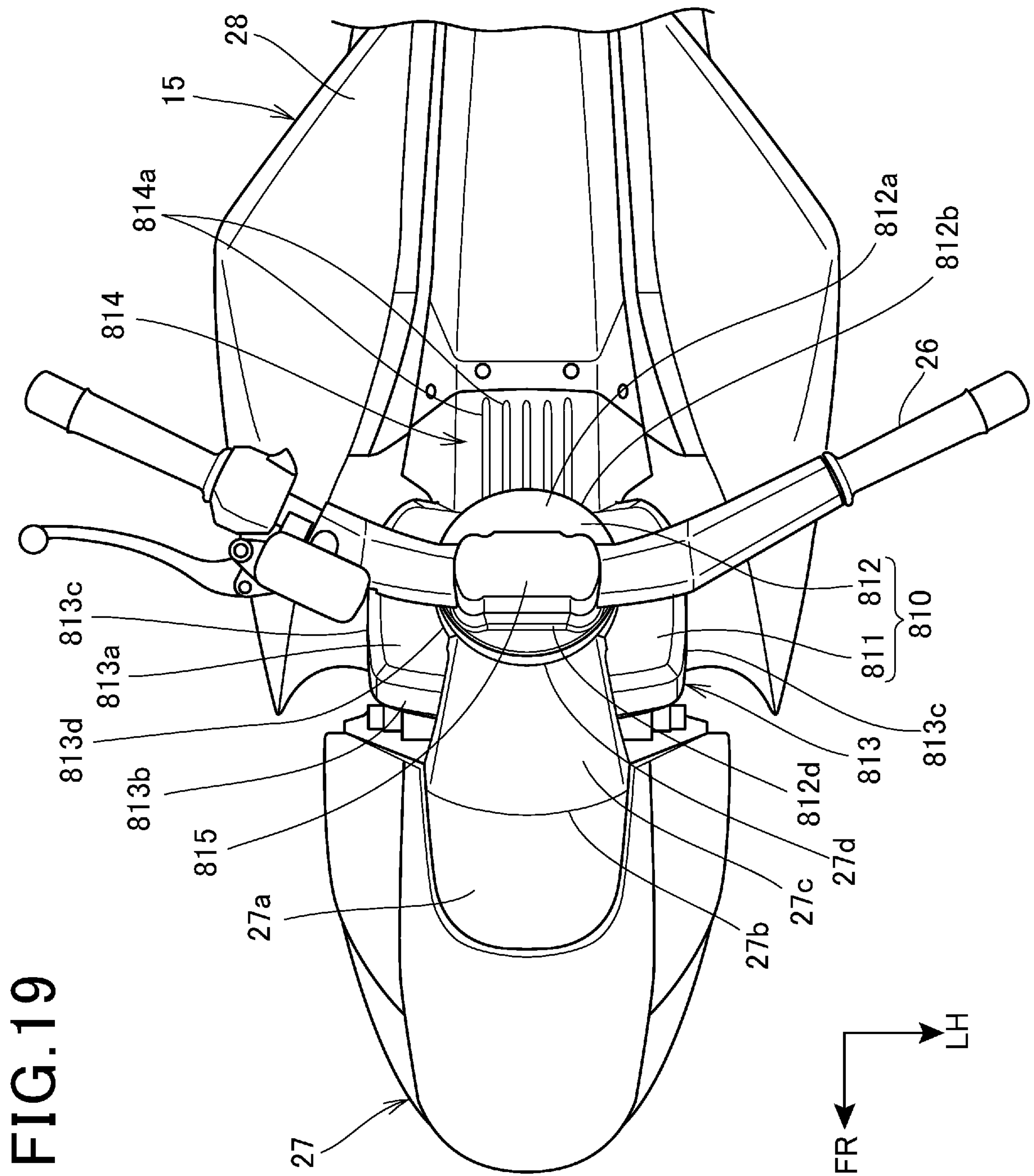
FIG. 19 is a plan view of the front portion of the vehicle.

FIG. 18 is a left-hand side elevational view of the steering swivel unit 13 and peripheral parts. FIG. 19 is a plan view of the front portion of the vehicle 1.

The vehicle cover 15 includes a cover assembly 810 covering the steering swivel unit 13 from above. The cover assembly 810 is positioned centrally in the transverse directions of the vehicle 1 and disposed between the front cover 27 and the tank cover 28 in the longitudinal directions of the vehicle 1.

The cover assembly 810 is disposed below the steering handle 26 and covers the steering handle turning mechanism 540 from above which is provided on the upper surface of the top bridge 33.

Figure 20:
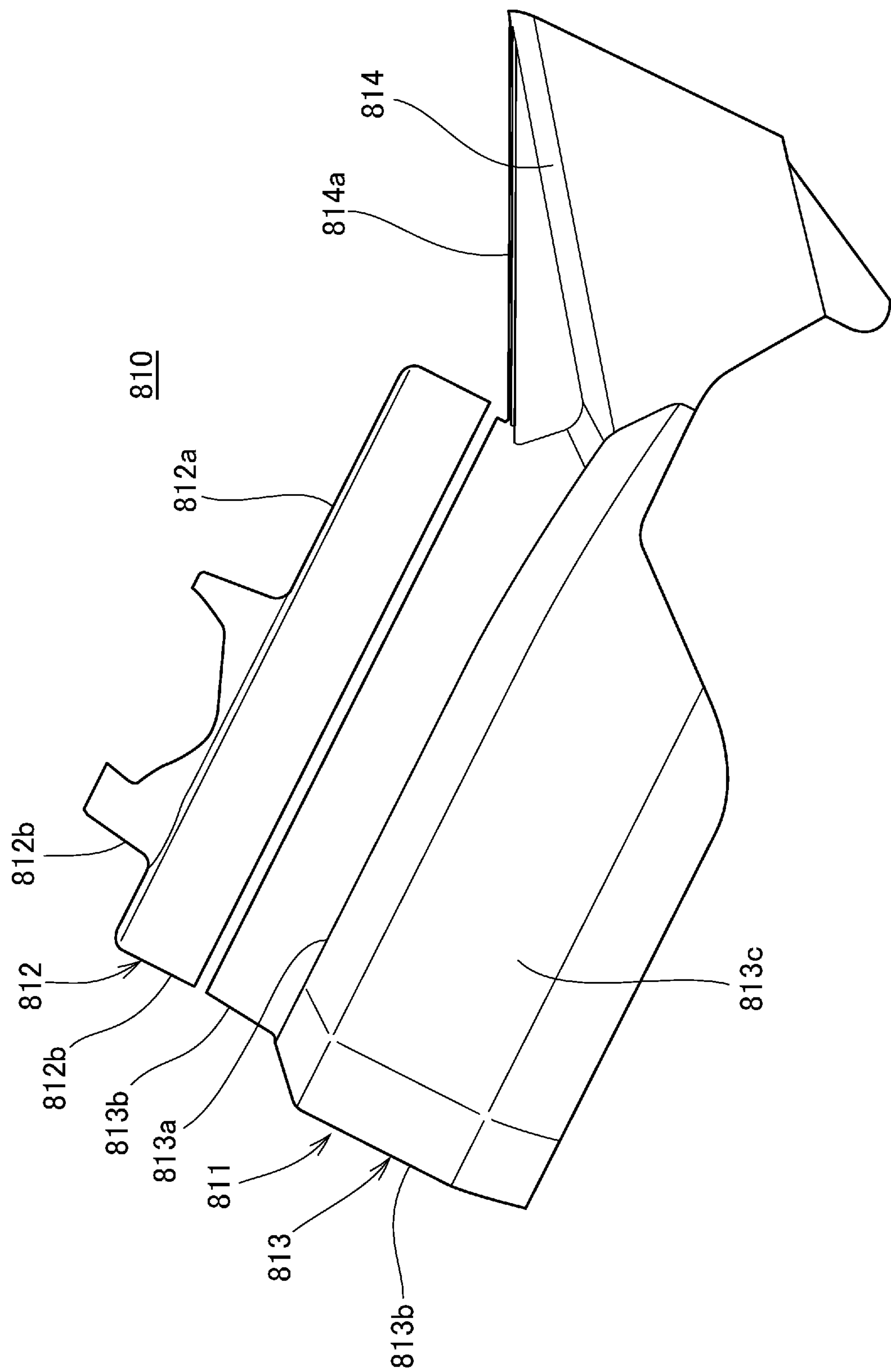
FIG. 20 is a left-hand side elevational view of a cover assembly.
Figure 21:
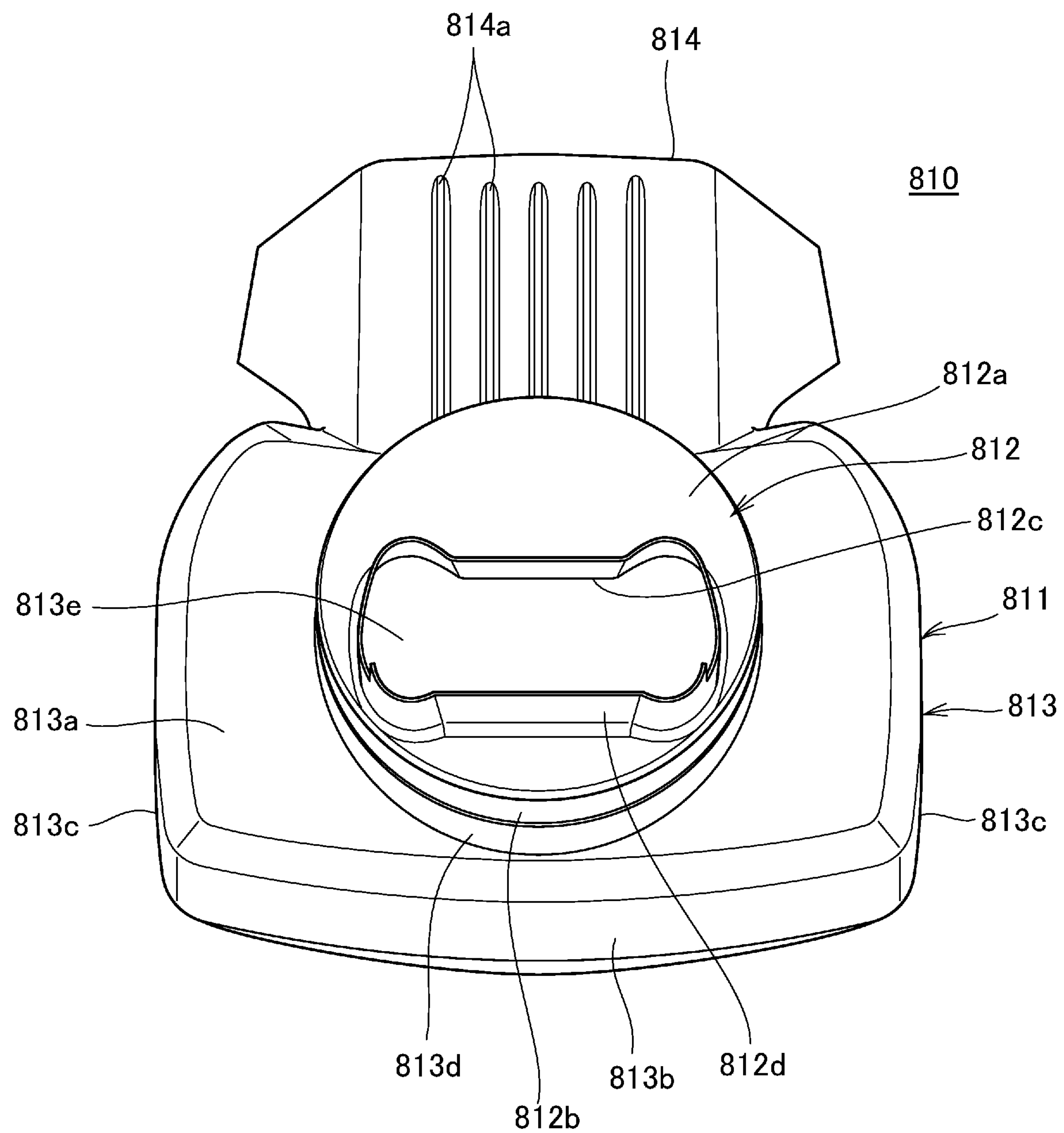
FIG. 21 is a plan view of the cover assembly.
Figure 22:
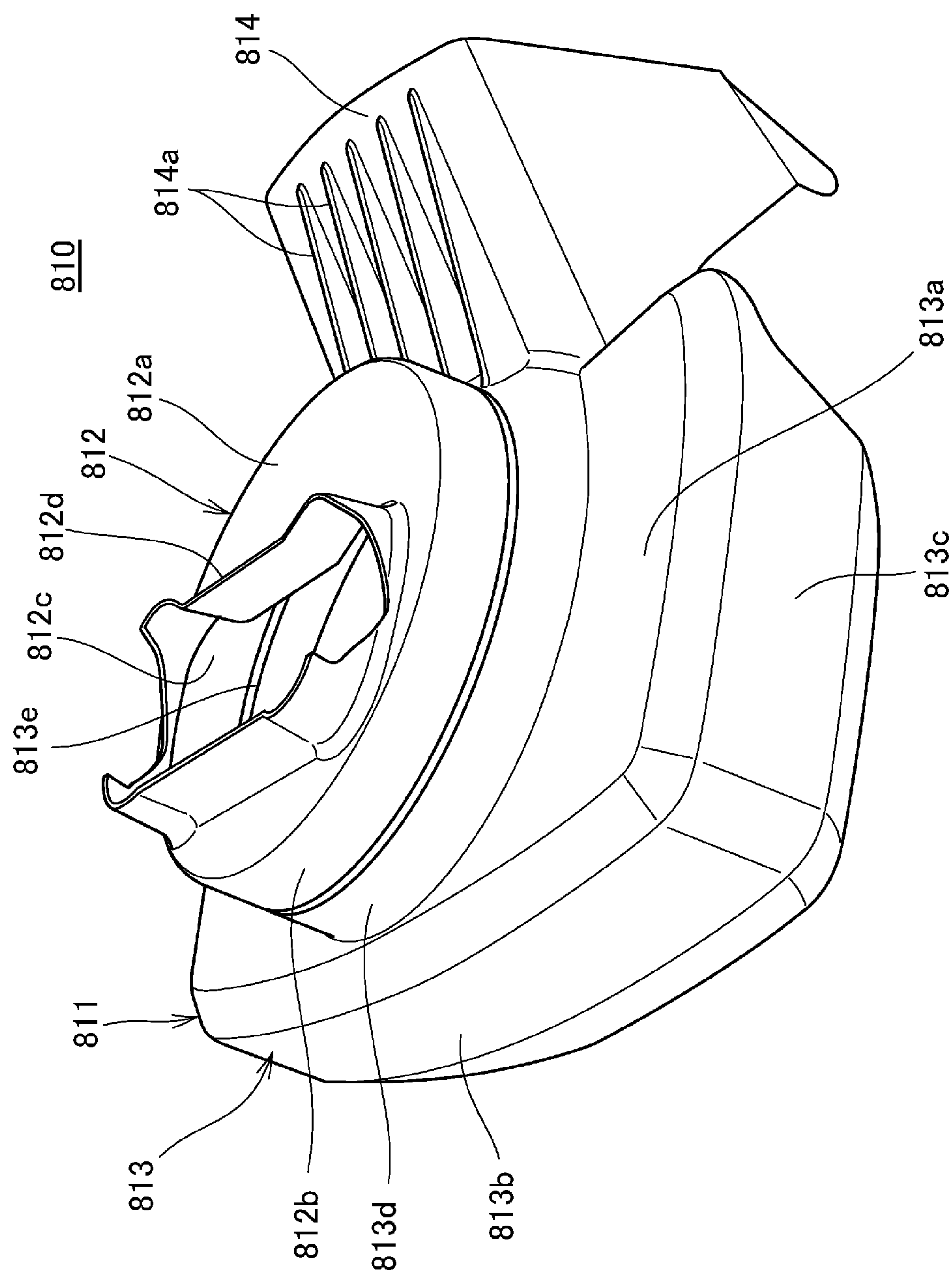
FIG. 22 is a perspective view of the cover assembly.

FIG. 20 is a left-hand side elevational view of the cover assembly 810. FIG. 21 is a plan view of the cover assembly 810. FIG. 22 is a perspective view of the cover assembly 810.

As depicted in FIGS. 18 through 22, the cover assembly 810 includes a fixed cover 811 fixed to the vehicle body 10 and a movable cover 812 covering an upper surface of the fixed cover 811 from above.

The fixed cover 811 includes a box-shaped portion 813 and a rearward extension 814 extending rearwardly from the box-shaped portion 813.

The box-shaped portion 813 has an upper face 813*a* extending rearwardly and downwardly as viewed in side elevation, a front face 813*b* extending downwardly from a front edge of the upper face 813, and a pair of side faces 813*c* extending downwardly from respective side edges of the upper face 813*a*. The box-shaped portion 813 is open downwardly.

The box-shaped portion 813 has a hollow cylindrical tubular member 813*d* disposed centrally on the upper face 813*a* in the transverse directions of the vehicle 1 and extending upwardly. The tubular member 813*d* has an inner peripheral surface that defines a circular upper opening 813*e* that extends vertically through the upper face 813*a*.

The rearward extension 814 extends rearwardly from a rear edge of the upper face 813*a* to a front edge 28*a* of the tank cover 28, and is contiguous to the front edge 28*a*. The fixed cover 811 is fixed to the vehicle body 10 with the rearward extension 814 being attached to the tank cover 28. The fixed cover 811 may alternatively be fixed to another cover than the vehicle cover 15, the vehicle frame 11, or the like.

The rearward extension 814 has a plurality of longitudinally extending upper ribs 814*a* formed on an upper surface thereof.

The movable cover 812 includes an upper wall 812*a* (upper face) which is circular in shape as viewed along the steering axis Cs and a hollow cylindrical peripheral wall 812*b* extending downwardly from the peripheral edge of the upper wall 812*a* toward the fixed cover 811.

The movable cover 812 has an opening 812*c* defined centrally in the upper wall 812*a* in the transverse directions of the vehicle 1 and extending vertically through the upper wall 812*a*. The movable cover 812 has an upwardly extending rib 812*d* formed along the peripheral edge of the opening 812*c*.

The hollow cylindrical peripheral wall 812*b* of the movable cover 812 is disposed coaxially with the hollow cylindrical tubular member 813*d* of the fixed cover 811, and has an outside diameter that is substantially the same as the outside diameter of the hollow cylindrical tubular member 813*d*. The hollow cylindrical peripheral wall 812*b* is thus vertically contiguous to the hollow cylindrical tubular member 813*d*.

The movable cover 812 is disposed in a manner to cover the circular upper opening 813*e* in the fixed cover 811 from above, and the hollow cylindrical peripheral wall 812*b* has a lower edge disposed closely to an upper edge of the hollow cylindrical tubular member 813*d* of the fixed cover 811.

As depicted in FIGS. 15 and 18, the fixed cover 811 is disposed around the case 541 of the steering handle turning mechanism 540 in covering relation thereto, the case 541 being housed within the box-shaped portion 813. An upper portion of the case 541 and the handle holder 560 are exposed upwardly through the upper opening 813*e* of the fixed cover 811.

The upper portion of the case 541 and the handle holder 560 are covered from above by the movable cover 812 which is disposed over the upper opening 813*e* of the fixed cover 811.

The handle holder 560 has an upper portion exposed upwardly through the opening 812*c* of the movable cover 812.

As depicted in FIGS. 13 and 15, the base 560*a* of the handle holder 560 has a pair of handle supports 560*c* provided on an upper surface thereof which extend upwardly from respective left and right positions that are spaced from the steering axis Cs. The cap 560*b* is fastened to upper surfaces of the handle supports 560*c* by a plurality of cap fastening bolts 560*d*.

As depicted in FIGS. 18 through 22, the handle supports 560*c* of the handle holder 560 are fitted from below in the opening 812*c* of the movable cover 812. The steering handle 26 is fixed to the handle supports 560*c* that extend through the opening 812*c* upwardly of the movable cover 812.

The movable cover 812 is fixed to the base 560*a* of the handle holder 560. Therefore, when the steering handle 26 is turned, the movable cover 812 is turned in unison with the steering handle 26 and the steering swivel unit 13. In other words, the movable cover 812 is turned relatively to the fixed cover 811. The axis about which the movable cover 812 is turned is aligned with the steering axis Cs.

Since the movable cover 812 that is fitted over the handle supports 560*c* is turned in unison with the handle holder 560, the opening 812*c* does not need to be large enough to let the handle supports 560*c* turn in the movable cover 812. Consequently, the movable cover 812 covers a wide area of the handle holder 560.

The movable cover 812 is positioned on the base 560*a* by the handle supports 560*c* fitted in the opening 812*c*.

The opening 812*c* is shaped complementarily to the outer profile of the handle supports 560*c*, i.e., front surfaces, rear surfaces, and left and right outer side surfaces of the handle supports 560*c*. Therefore, the handle supports 560*c* are snugly fitted in the opening 812*c*.

As depicted in FIGS. 18 and 19, the cap 560*b* is covered from above by the handle cover 815 that covers the rib 812*d* from above.

As depicted in FIGS. 18 through 20, the front cover 27 includes an extension cover 27*c* extending rearwardly from an upper edge 27*b* of a front cover face 27*a* that extends rearwardly and upwardly.

The extension cover 27*c* extends rearwardly and downwardly from the upper edge 27*b*, and is contiguous to a front edge of the hollow cylindrical peripheral wall 812*b* of the movable cover 812. The trail-length changing mechanism 30 that is disposed between the head pipe 17 and the front cover 27 is thus covered from above and hence concealed by the extension cover 27*c*. The extension cover 27*c* has a rear edge 27*d* that is arcuate along the hollow cylindrical peripheral wall 812*b*. Therefore, the extension cover 27*c* covers a wide area around the trail-length changing mechanism 30.

According to the first embodiment of the present invention, as described above, the vehicle 1 includes the vehicle frame 11, the steering swivel unit 13 supported on the head pipe 17 of the vehicle frame 11 and angularly movable about the steering axis Cs, the front wheel 2 angularly movable in unison with the steering swivel unit 13, and the automatic steering mechanism 31 for angularly moving the steering swivel unit 13. The vehicle frame 11 includes the main frame 18 extending rearwardly from the head pipe 17. The automatic steering mechanism 31 includes the steering motor 80 for angularly moving the steering swivel unit 13. The steering motor 80 is supported on the main frame 18. Therefore, the steering motor 80 of the automatic steering mechanism 31 can be well supported with a simple structure, utilizing the main frame 18.

As steering motor 80 is disposed centrally in the transverse directions of the vehicle 1, behind the head pipe 17, it allows the vehicle 1 to have a good weight balance in the transverse directions of the vehicle 1.

The main frame 18 includes the pair of left and right upper frames 18*b* extending rearwardly from the head pipe 17, and the steering motor 80 is disposed in a position between the left and right upper frames 18*b*. Accordingly, the steering motor 80 is effectively supported, using the left and right upper frames 18*b*. Since the steering motor 80 is positioned in a space between the left and right upper frames 18*b*, the steering motor 80 is covered with the upper frames 18*b* and is protected thereby and concealed for a better appearance.

The pair of left and right upward extensions 501 extend upwardly from the upper frames 18*b*, and the steering motor 80 is supported on the upper frames 18*b* through the upward extensions 501 and disposed between the left and right upward extensions 501. Therefore, the steering motor 80 is covered with the upward extensions 501 and protected thereby and concealed for a better appearance. The steering motor 80 is disposed in a high position, making it easy to transmit power thereof to the top bridge 33 in the upper portion of the steering swivel unit 13.

The housing 503 that serves as a cross member interconnecting the left and right upward extensions 501 in the transverse directions of the vehicle 1 are provided, and the steering motor 80 is mounted on the lower surface of the housing 503. The housing 503 increases the rigidity of the main frame 18, and covers the steering motor 80 to protect the steering motor 80 and provide an improved appearance.

Since the speed reducer 502 for reducing the speed of the output power from the steering motor 80 is supported on the housing 503, the speed reducer 502 is supported with a simple structure.

The steering motor 80 is an electric motor and is disposed such that the rotational shaft 80*a* thereof has its central axis 80*c* directed vertically. Therefore, the steering motor 80 is disposed compactly in the transverse directions of the vehicle 1.

Furthermore, as the steering motor 80 is coupled to the steering swivel unit 13 through the steering link 81 that is positioned outwardly of the head pipe 17 in the transverse directions of the vehicle 1, the steering motor 80 is capable of exerting large drive power to the steering swivel unit 13, making it possible to turn the steering swivel unit 13 with ease.

According to the first embodiment of the present invention, in addition, the vehicle 1 includes the vehicle frame 11, the steering swivel unit 13 supported on the head pipe 17 of the vehicle frame 11 and angularly movable about the steering axis Cs, the front wheel 2 angularly movable in unison with the steering swivel unit 13, the steering handle 26 mounted on the steering swivel unit 13, and the steering handle turning mechanism 540 that makes the steering handle 26 angularly movable about the steering axis Cs relatively to the steering swivel unit 13. The steering handle turning mechanism 540 includes the handle turning motor 543 for angularly moving the steering handle 26 about the steering axis Cs. When the steering handle 26 is turned relatively to the steering swivel unit 13 by the handle turning motor 543, the steering handle 26 can be turned in a direction different from the direction in which the front wheel 2 is steered. Therefore, the movement of the steering handle 26 that is linked with the movement of the front wheel 2 is made less liable to be transmitted to the rider.

The steering swivel unit 13 includes the steering shaft 32 rotatably supported by the head pipe 17, the top bridge 33 fixed to the upper end of the steering shaft 32, and the bottom member 34 fixed to the lower end of the steering shaft 32, the steering handle turning mechanism 540 being mounted on the top bridge 33. Since the steering handle turning mechanism 540 is mounted on the top bridge 33 of the steering swivel unit 13, it is easy to realize a structure that allows the rider to turn the top bridge 33 directly through the steering handle 26 in the event of a malfunction of the handle turning motor 543.

The steering handle turning mechanism 540 includes the handle turning lock mechanism 544 for locking the steering handle 26 against angular movement relative to the steering swivel unit 13. When the steering handle 26 is locked by the handle turning lock mechanism 544, therefore, the rider is able to turn the steering swivel unit 13 directly through the steering handle 26.

Furthermore, inasmuch as the steering handle turning mechanism 540 includes the speed reducer 559 for reducing the speed of rotation of the handle turning motor 543 and transmitting the reduced-speed rotation to the steering handle 26, the steering handle 26 can easily be turned by the handle turning motor 543. In addition, power that is transmitted from the steering handle 26 to the handle turning motor 543 tends to be accelerated. Therefore, when the rider is to turn the steering swivel unit 13 through the steering handle 26, the rider finds it easy to turn the steering swivel unit 13 through the steering handle 26 because the steering handle 26 is hard to turn relatively to the steering swivel unit 13.

The handle turning lock mechanism 544 is disposed upstream of the speed reducer 559 with respect to the path along which the rotation is transmitted from the handle turning motor 543 to the steering handle 26. Since rotation that is transmitted from the steering handle 26 through the speed reducer 559 to the handle turning motor 543 tends to be accelerated, the torque transmitted from the steering handle 26 through the speed reducer 559 to the handle turning motor 543 is reduced. Therefore, the handle turning lock mechanism 544 that is disposed upstream of the speed reducer 559 is able to limit rotation of the handle turning motor 543 even if the handle turning lock mechanism 544 is of a reduced locking capability, allowing the rider to turn the steering swivel unit 13 easily through the steering handle 26.

The steering handle turning mechanism 540 includes the case 541 disposed above the steering swivel unit 13 and the rotor 542 housed in the case 541 and actuatable by the handle turning motor 543, the steering handle 26 being supported on the upper end of the rotor 542. The rotor 542 that is actuatable by the handle turning motor 543 can thus be supported with a simple structure by the case 541 disposed above the steering swivel unit 13, and the steering handle 26 is provided at an upper position where it is easy for the rider to manipulate the steering handle 26.

The rotor 542 includes the turn shaft 557 angularly movable by the handle turning motor 543, the handle holder 560 supporting the steering handle 26, and the speed reducer 559 for reducing the speed of rotation transmitted to the turn shaft 557 and transmitting the reduced-speed rotation to the handle holder 560. The turn shaft 557, the speed reducer 559, and the handle holder 560 are provided coaxially with each other. Therefore, the steering handle turning mechanism 540 is provided in a compact layout.

The handle turning motor 543 is disposed rearwardly of the rotor 542 and mounted on the case 541. Therefore, the handle turning motor 543 is provided compactly in a position where it can easily actuate the rotor 542.

The handle turning lock mechanism 544 is mounted on the lower surface of the case 541 and engages the lower end of the rotor 542. The handle turning lock mechanism 544 is thus fixed in position with a simple structure and provided in a compact layout.

Since the handle turning lock mechanism 544 is provided coaxially with the central axis **557*a* of the turn shaft 557 about which the steering handle 26 can be turned, the handle turning lock mechanism 544** is provided in a compact layout.

Furthermore, the central axis **557*a* of the turn shaft 557 about which the steering handle 26 can be turned is coaxial with the steering axis Cs. Consequently, even when the steering swivel unit 13 is steered to the left or right, the steering handle 26 can be angularly moved about the steering axis Cs. Therefore, the movement of the steering handle 26** can effectively be reduced and is less liable to be transmitted to the rider.

Moreover, the controller 83 energizes the handle turning motor 543 to turn the steering handle 26 in the opposite direction to the direction in which the steering swivel unit 13 is turned. Accordingly, the angle through which the steering handle 26 is turned at the time the front wheel 2 is turned is reduced.

The controller 83 also changes the angle through which the steering handle 26 is turned in the opposite direction, depending on the vehicle speed V detected by the vehicle speed sensor 87. Therefore, the angle through which the steering handle 26 is turned can be of an appropriate value depending on the vehicle speed V.

Furthermore, the controller 83 reduces the angle through which the steering handle 26 is turned in the opposite direction as much as the vehicle speed V increases. Therefore, when the vehicle speed V is low, the angle through which the steering handle 26 is turned by the steering of the front wheel 2 is small. As the vehicle speed V goes higher, the movement of the steering handle 26 becomes synchronized with the direction in which the front wheel 2 is steered. Thus, the rider finds it easy to drive the vehicle 2.

Moreover, as the vehicle 1 includes the automatic steering mechanism 31 for automatically turning the steering swivel unit 13, the angle through which the steering handle 26 is turned is reduced at the time the front wheel 2 is automatically steered by the automatic steering mechanism 31.

If it is detected that the vehicle speed V detected by the vehicle speed sensor 87 is in excess of the predetermined speed, then the handle turning lock mechanism 544 locks the steering handle 26 against angular movement relative to the steering swivel unit 13. When the vehicle speed V exceeds the predetermined speed, therefore, the steering handle 26 is directly connected to the steering swivel unit 13 by the handle turning lock mechanism 544, so that the rider can steer the front wheel 2 directly through the steering handle 26.

According to the first embodiment of the present invention, furthermore, the vehicle 1 includes the vehicle frame 11, the steering swivel unit 13 supported on the head pipe 17 of the vehicle frame 11 and angularly movable about the steering axis Cs, the steering handle 26 mounted on the steering swivel unit 13, and the cover assembly 810 covering the steering swivel unit 13 from above. The cover assembly 810 includes the fixed cover 811 that is fixed to the vehicle body 10 and the movable cover 812 that covers the upper opening **813*e* of the fixed cover 811 and that is angularly movable with respect to the fixed cover 811, the movable cover 812 being angularly movable in unison with the steering handle 26. The fixed cover 811 fixed to the vehicle body 10 and the movable cover 812 cover the steering swivel unit 13 from above. Since the movable cover 812 is angularly movable in unison with the steering handle 26, it covers a wide area around the steering swivel unit 13**.

The upper wall **812*a* of the movable cover 812 has the opening 812*c* in which there is fitted the handle holder 560 that supports the steering handle 26 on the steering swivel unit 13. Accordingly, the movable cover 812 is positioned by the handle holder 560 and covers a wide area around the handle holder 560**.

Since the opening 812*c* is shaped complementarily to the outer profile of the handle holder 560, the movable cover 812 is positioned to a nicety by the handle holder 560 and covers a wide area around the handle holder 560.

As the movable cover 812 has the upwardly extending rib 812*d* formed along the peripheral edge of the opening 812*c*, the rib 812*d* increases the rigidity of the movable cover 812 and covers the handle holder 560 sideways. In case the rib 812*d* abuts against the handle holder 560, the movable cover 812 and the handle holder 560 are held in abutment against each other over an increased area, making it possible to position the movable cover 812 effectively on the handle holder 560.

The movable cover 812 includes the upper wall 812*a* which is circular in shape as viewed along the steering axis Cs and the hollow cylindrical peripheral wall 812*b* extending from the peripheral edge of upper wall 812*a* toward the fixed cover 811. Therefore, even when the movable cover 812 is angularly moved, the movable cover 812 is not likely to present an obstacle to surrounding parts. Accordingly, the movable cover 812 may be of an increased size to cover a wide range.

The front cover 27 that covers the head pipe 17 on its front side includes the extension cover 27*c* extending rearwardly from the upper edge 27*b* thereof. The rear edge of the extension cover 27*c* is contiguous to the front edge of the movable cover 812. Therefore, the extension cover 27*c* covers the space between the upper edge 27*b* of the front cover 27 and the front edge of the movable cover 812.

The vehicle 1 further includes the steering handle turning mechanism 540 that turns the steering handle 26 about the steering axis Cs with respect to the steering swivel unit 13, and the cover assembly 810 covers the steering handle turning mechanism 540 from above. Therefore, the cover assembly 810 effectively conceals the steering handle turning mechanism 540.

According to the first embodiment of the present invention, moreover, the vehicle 1 includes the vehicle body 10, the front wheel 2 disposed forwardly of the vehicle body 10 and steerable about the steering axis Cs, the vehicle body 10 including the vehicle frame 11 and the steering swivel unit 13 supported on the vehicle frame 11 and angularly movable about the steering axis Cs, and the trail-length changing mechanism 30 for changing the trail length t of the front wheel 2. The trail-length changing mechanism 30 includes the swing assembly 41 that supports the front fork legs 25L and 25R which are swingable in the longitudinal directions and support the front wheel 2, and the electric motor 42 as a drive source for swinging the swing assembly 41, the electric motor 42 being supported on the vehicle body 10. Since the electric motor 42 is supported on the vehicle body 10, the electric motor 42 is close to the steering axis Cs and hence lowers the steering inertia.

Since the electric motor 42 is supported on the steering swivel unit 13 on the vehicle body 10, the electric motor 42 is close to the steering axis Cs and hence lowers the steering inertia. Furthermore, as the steering swivel unit 13 is angularly movable in unison with the swing assembly 41, power from the electric motor 42 supported on the steering swivel unit 13 is transmitted through a simple structure to the swing assembly 41, swinging the swing assembly 41.

Moreover, the electric motor 42 is disposed forwardly of the steering swivel unit 13 as viewed in side elevation, and the central axis 42*c* of the rotational shaft 42*b* thereof is oriented vertically. Therefore, the electric motor 42 is disposed compactly for lowering the steering inertia. The central axis 42*c* may be oriented in the vertical directions of the vehicle 1, or may be oriented substantially in the vertical directions of the vehicle 1 or may be oriented in the vertical directions of the vehicle 1 in an inclined posture as viewed in side elevation in FIG. 10, for example.

The trail-length changing mechanism 30 includes the ball screw mechanism 43 for converting rotation of the electric motor 42 into linear motion to cause the swing assembly 41 to swing. The ball screw mechanism 43 is disposed such that the central axis of the screw shaft 51 thereof lies parallel to the central axis 42*c* of the electric motor 42. Therefore, the electric motor 42 and the ball screw mechanism 43 are disposed in a compact layout, thereby lowering the steering inertia.

The trail-length changing mechanism 30 further includes the speed reducer 45 for transmitting rotation of the electric motor 42 at a reduced ratio to the ball screw mechanism 43, and the lock mechanism 46 for limiting the electric motor 42 against rotation is disposed upstream of the speed reducer 45 with respect to the path along which the rotation of the electric motor 42 is transmitted. Since rotation transmitted from the swing assembly 41 through the ball screw mechanism 43 and the speed reducer 45 to the electric motor 42 tends to be accelerated, the torque that is transmitted from the swing assembly 41 through the speed reducer 45 to the electric motor 42 is reduced. Therefore, the lock mechanism 46 that is disposed upstream of the speed reducer 45 is able to limit rotation of the electric motor 42 even if the lock mechanism 46 is of a reduced locking capability, making it easy to limit operation of the trail-length changing mechanism 30.

As the lock mechanism 46 is disposed coaxially with the central axis 42*c* of the electric motor 42, the lock mechanism 46 is provided in a compact fashion.

The trail-length changing mechanism 30 further includes the link mechanism 47 that couples the ball screw mechanism 43 to the swing assembly 41 and the steering swivel unit 13, and the steering swivel unit 13 includes the steering shaft 32 rotatably supported by the head pipe 17 of the vehicle frame 11, the top bridge 33 fixed to the upper end of the steering shaft 32, and the bottom member 34 fixed to the lower end of the steering shaft 32. The swing assembly 41 is swingably supported by the swing shaft 48 provided on the top bridge 33 and is coupled to the bottom member 34 through the link mechanism 47. The swing assembly 41 that is swingable about the swing shaft 48 on the top bridge 33 can thus swing through the link mechanism 47 coupled to the bottom member 34, so that the swing assembly 41 can swing with a compact structure for changing the trail length t.

The swing assembly 41 includes the bottom bridge 49 interconnecting the left and right front fork legs 25L and 25R, and the link mechanism 47 is coupled to the bottom bridge 49. The link mechanism 47 is thus coupled to the swing assembly 41 with a compact structure, using the bottom bridge 49 that increases the rigidity of the front fork legs 25L and 25R.

The bracket 36 that interconnects the top bridge 33 and the bottom member 34 of the steering swivel unit 13 is provided forwardly of the head pipe 17, and the electric motor 42 is supported on the vehicle body 10 by the bracket 36. As the bracket 36 interconnects the top bridge 33 and the bottom member 34 forwardly of the head pipe 17, the bracket 36 is close to the steering axis Cs. Consequently, the electric motor 42 is disposed closely to the steering axis Cs, thereby lowering the steering inertia.

According to the first embodiment, furthermore, the vehicle 1 includes the vehicle body 10, the front wheel 2 disposed forwardly of the vehicle body 10 and steerable about the steering axis Cs, the front fork legs 25L and 25R that support the front wheel 2, the vehicle body 10 including the vehicle frame 11 and the steering swivel unit 13 supported on the head pipe 17 of the vehicle frame 11 and angularly movable about the steering axis Cs, and the trail-length changing mechanism 30 for changing the trail length t of the front wheel 2. The trail-length changing mechanism 30 includes the swing shaft 48 extending in the transverse directions of the vehicle 1 and coupling the front fork legs 25L and 25R swingably to the steering swivel unit 13, the swing shaft 48 being disposed in a position aligned with the fork leg axis 25*a* of the front fork legs 25L and 25R as viewed in side elevation. Since the front fork legs 25L and 25R swing about the swing shaft 48 disposed in the position aligned with the fork leg axis 25*a*, the inertial mass of the front fork legs 25L and 25R at the time they swing to change the trail length t is reduced. Therefore, the trail-length changing mechanism 30 can easily change the trail length t.

Inasmuch as the swing shaft 48 is provided on the upper ends of the front fork legs 25L and 25R, the swing shaft 48 is provided compactly by effectively utilizing a space at the upper ends of the front fork legs 25L and 25R. As no space needs to be kept above the swing shaft 48 for swinging movement of the front fork legs 25L and 25R, the degree of freedom for the layout of parts is high.

The front fork legs 25L and 25R have the fork caps 25*d* that close the upper openings of the front fork legs 25L and 25R, and the swing shaft 48 is provided on the fork caps 25*d*. Therefore, the swing shaft 48 is provided in a simple structure using the fork caps 25*d*.

The steering swivel unit 13 includes the steering shaft 32 rotatably supported by the head pipe 17 of the vehicle frame 11, the top bridge 33 fixed to the upper end of the steering shaft 32, and the bottom member 34 fixed to the lower end of the steering shaft 32, and the trail-length changing mechanism 30 includes the electric motor 42 and the link mechanism 47 interconnecting the front fork legs 25L and 25R and the bottom member 34, for causing the front fork legs 25L and 25R to swing with power from the electric motor 42, the swing shaft 48 being supported on the top bridge 33. The front fork legs 25L and 25R supported by the swing shaft 48 on the top bridge 33 can thus swing through the link mechanism 47 coupled to the bottom member 34, so that the front fork legs 25L and 25R can swing with a compact structure for thereby changing the trail length t.

Moreover, the front fork legs 25L and 25R include an electronically controlled suspension capable of automatically changing their axial length, and the vehicle 1 includes the controller 83 for actuating the electronically controlled suspension to reduce a change in the height of the vehicle 1 caused when the trail-length changing mechanism 30 operates, depending on that change in the height of the vehicle 1. Consequently, even when the trail-length changing mechanism 30 changes the trail length t, a change in the height of the vehicle 1 is reduced. When the vehicle 1 is at rest, the height of the vehicle 1 may be reduced by the electronically controlled suspension to allow the rider to secure its footing on the vehicle 1 with ease.

Second Embodiment

A second embodiment of the present invention will be described below with reference to FIGS. 23 and 24. Those parts of the second embodiment which are identical to those of the first embodiment are denoted by identical reference characters, and will not be described below.

The second embodiment is different from the first embodiment in that it has a structure for changing a torque transmitted between the steering motor 80 and the steering swivel unit 13.

Figure 23:
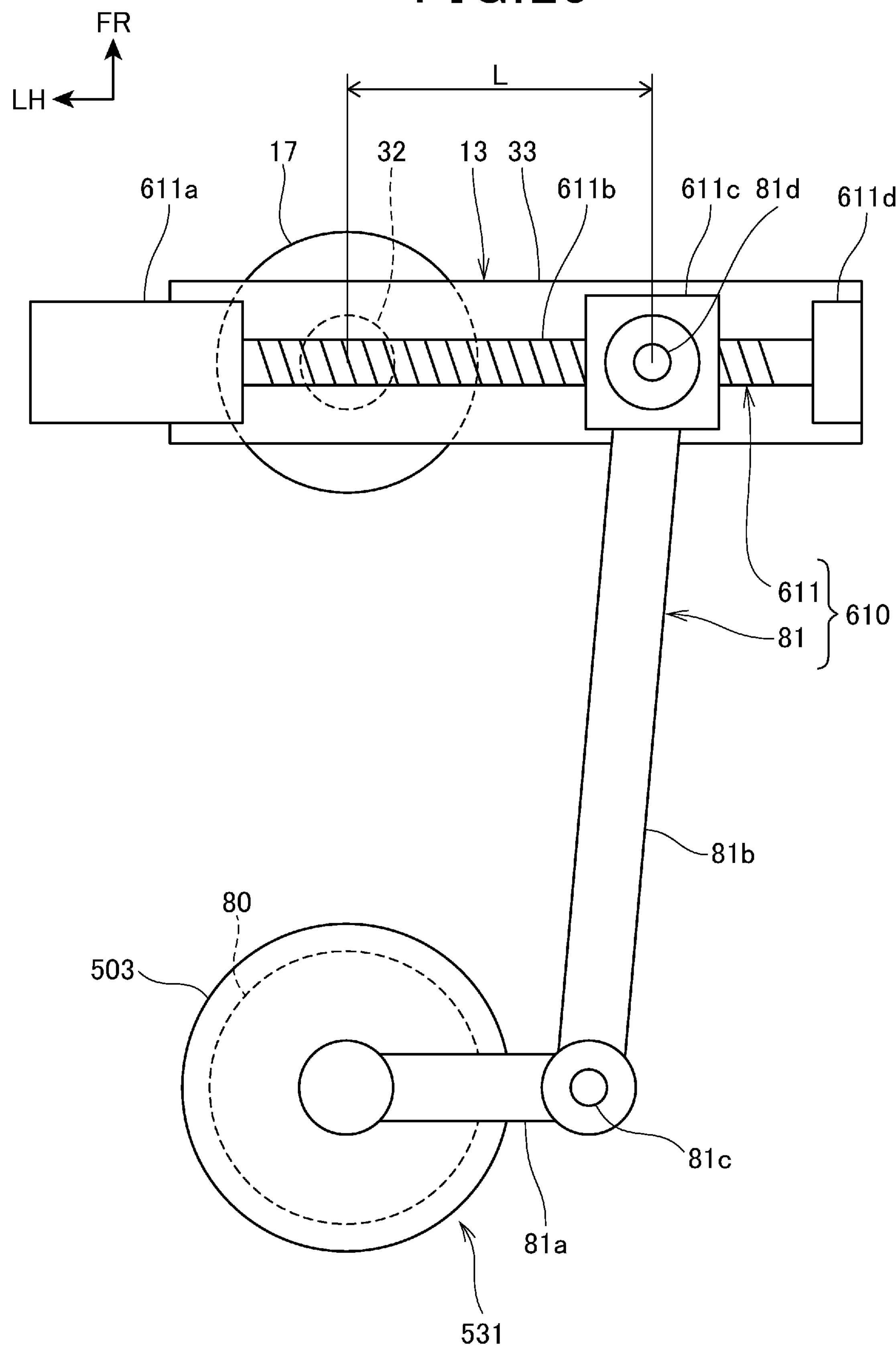
FIG. 23 is a schematic plan view of an automatic steering mechanism according to a second embodiment of the present invention.

FIG. 23 is a schematic plan view of an automatic steering mechanism 531 according to a second embodiment of the present invention.

As depicted in FIG. 23, the automatic steering mechanism 531 includes the steering motor 80, a speed reducer 502 (FIG. 14), a housing 503, and a transmitted torque changing mechanism 610.

The transmitted torque changing mechanism 610 includes the steering link 81 and a screw mechanism 611 provided on the upper surface of the top bridge 33.

The screw mechanism 611 includes a transmitted torque changing motor 611*a* provided on the upper surface of the top bridge 33, a screw shaft 611*b* having an end coupled to the transmitted torque changing motor 611*a*, a nut 611*c* threaded over the screw shaft 611*b*, and a bearing 611*d* mounted on the top bridge 33 and supporting the other end of the screw shaft 611*b*.

The transmitted torque changing motor 611*a* is disposed remotely from the steering link 81 with the head pipe 17 interposed therebetween in the transverse directions of the vehicle. The transmitted torque changing motor 611*a* is connected to the controller 83 (FIG. 11).

The screw shaft 611*b* extends over the top bridge 33 from the transmitted torque changing motor 611*a* toward the steering link 81 in a transverse direction of the vehicle. The other end of the screw shaft 611*b* is supported by the bearing 611*d* that is disposed on an outer end of the top bridge 33 in the transverse direction of the vehicle.

The joint arm 81*b* of the steering link 81 has a front end coupled to the nut 611*c* by the joint shaft 81*d*.

When the controller 83 energizes the transmitted torque changing motor 611*a* to rotate the screw shaft 611*b* about its own axis, the nut 611*c* moves on the screw shaft 611*b* in a transverse direction of the vehicle. The distance L from the steering shaft 32 (steering axis Cs) to the nut 611*c* changes, changing the torque that is transmitted from the steering motor 80 to steering swivel unit 13.

Specifically, the portion of the screw shaft 611*b* that corresponds to the distance L functions as a torque transmitting arm for transmitting the torque from the steering motor 80 to the steering swivel unit 13. When the distance L that represents the length of the torque transmitting arm is changed, the torque transmitted from the steering motor 80 to the steering swivel unit 13 is changed.

Figure 24:
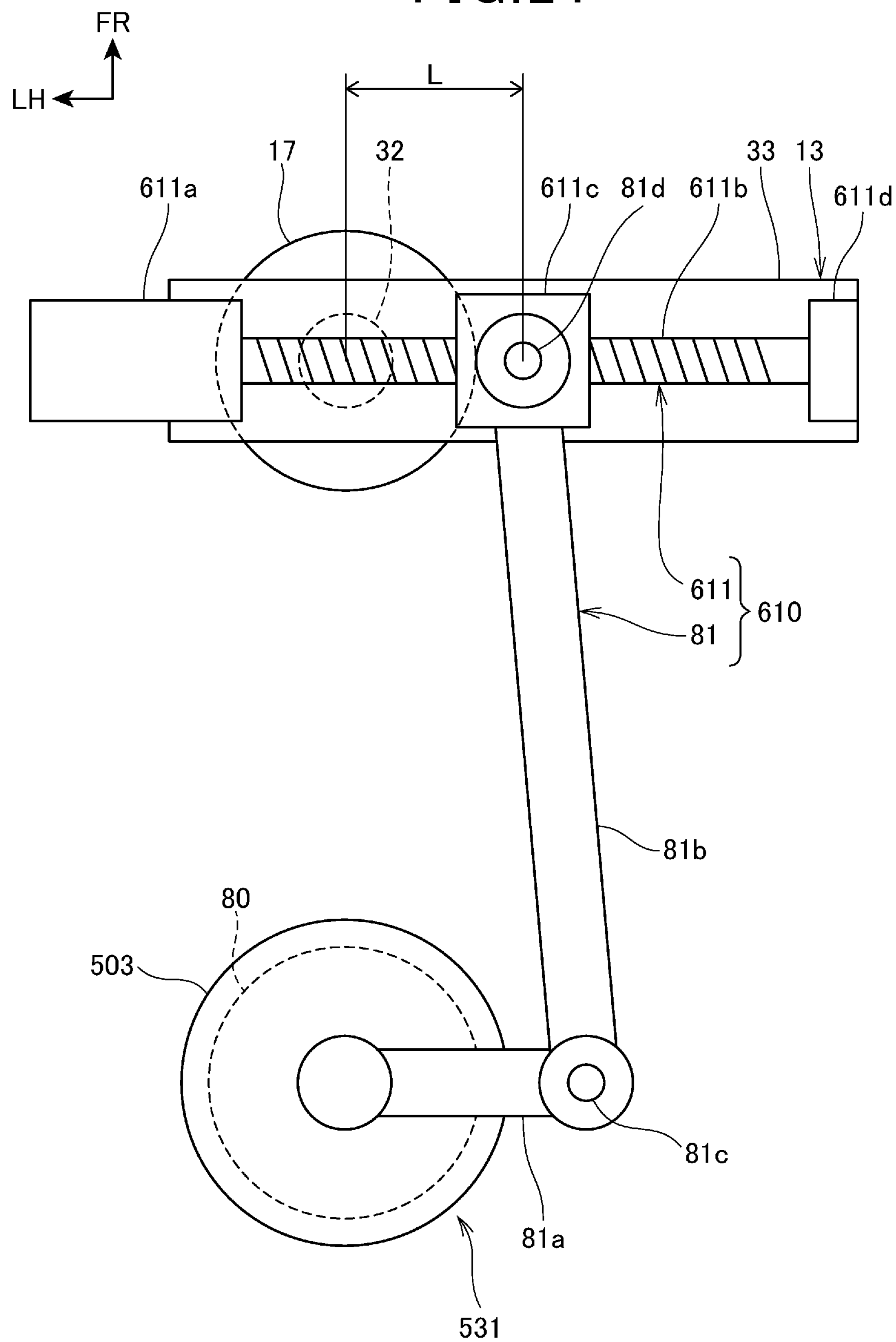
FIG. 24 is a schematic plan view of the automatic steering mechanism, with a speed reduction ratio changed from the state depicted in FIG. 23.

FIG. 24 is a schematic plan view depicting the length of the torque transmitting arm which has been changed from the state depicted in FIG. 23.

In FIG. 24, the nut 611*c* has moved toward the steering shaft 32 from the state depicted in FIG. 23, and the distance L that represents the length of the torque transmitting arm is smaller than that depicted in FIG. 23. In other words, the length of the torque transmitting arm depicted in FIG. 24 is smaller than that depicted in FIG. 23, and the length of the torque transmitting arm depicted in FIG. 23 is larger than that depicted in FIG. 24.

When the length of the torque transmitting arm is larger as depicted in FIG. 23, the torque transmitted from the steering motor 80 through the steering link 81 to the top bridge 33 is larger, so that it is easier for the steering motor 80 to turn the steering swivel unit 13.

If the rider attempts to turn the steering motor 80 from the steering swivel unit 13 side when the length of the torque transmitting arm is larger, then since the transmitted torque is reduced, the rider finds it hard to turn the steering motor 80. Therefore, providing the length of the torque transmitting arm is larger, if the rider attempts to manually turn the steering swivel unit 13 through the steering handle 26 while the steering motor 80 is de-energized, the steering motor 80 presents resistance (friction), making the rider feel heavy in steering the steering swivel unit 13.

When the length of the torque transmitting arm is smaller as depicted in FIG. 24, the torque transmitted from the steering motor 80 through the steering link 81 to the top bridge 33 is smaller, so that it is harder for the steering motor 80 to turn the steering swivel unit 13.

If the rider attempts to turn the steering motor 80 from the steering swivel unit 13 side when the length of the torque transmitting arm is smaller, then since the transmitted torque is increased, the rider finds it easy to turn the steering motor 80. Therefore, providing the length of the torque transmitting arm is smaller, if the rider attempts to manually turn the steering swivel unit 13 through the steering handle 26 while the steering motor 80 is de-energized, the resistance presented by the steering motor 80 is reduced, making the rider feel light in steering the steering swivel unit 13.

If the vehicle speed detected by the vehicle speed sensor 87 is equal to or lower than the predetermined speed (e.g., 4 kilometers per hour) including the at-rest state (0 kilometer per hour) and the front wheel 2 is steered by the automatic steering mechanism 531, then the controller 83 energizes the transmitted torque changing motor 611*a*, making the length of the torque transmitting arm larger. The steering motor 80 is now able to turn the steering swivel unit 13 easily to steer the front wheel 2.

If the vehicle speed detected by the vehicle speed sensor 87 is in excess of the predetermined speed (e.g., 4 kilometers per hour) and the front wheel 2 is not steered by the automatic steering mechanism 531, then the controller 83 energizes the transmitted torque changing motor 611*a*, making the length of the torque transmitting arm smaller. When the rider turns the steering handle 26, therefore, the steering motor 80 is less liable to present resistance, and the rider finds it easy to manually steer the front wheel 2.

Third Embodiment

A third embodiment of the present invention will be described below. Those parts of the third embodiment which are identical to those of the first embodiment are denoted by identical reference characters, and will not be described below.

According to the third embodiment, the vehicle includes a separating mechanism for separating the steering motor 80 from the power transmitting path between the steering motor 80 and the steering swivel unit 13 in order to make the rider feel light in steering the steering swivel unit 13.

The separating mechanism (not depicted) includes, for example, an electromagnetic clutch interposed between the steering motor 80 and the steering link 81 in the path along which power is transmitted from the steering motor 80.

If the vehicle speed detected by the vehicle speed sensor 87 is equal to or lower than the predetermined speed (e.g., 4 kilometers per hour) including the at-rest state (0 kilometer per hour) and the front wheel 2 is steered by the automatic steering mechanism 31, then the controller 83 energizes the electromagnetic clutch referred to above, connecting the steering motor 80 to the steering link 81. The steering motor 80 is now able to turn the steering swivel unit 13.

If the vehicle speed detected by the vehicle speed sensor 87 is in excess of the predetermined speed (e.g., 4 kilometers per hour) and the front wheel 2 is not steered by the automatic steering mechanism 31, then the controller 83 de-energizes the electromagnetic clutch, separating the steering motor 80 from the above power transmitting path. When the rider turns the steering handle 26, therefore, the steering motor 80 does not present resistance, and the rider finds it easy to manually steer the front wheel 2.

Moreover, if the controller 83 detects a failure such as a malfunction or the like of the steering motor 80, then the controller 83 de-energizes the electromagnetic clutch, separating the steering motor 80 from the above power transmitting path. In the event of a failure of the steering motor 80, consequently, the steering motor 80 does not present resistance to the steering operation, and the rider finds it easy to manually steer the front wheel 2.

Fourth Embodiment

A fourth embodiment of the present invention will be described below. Those parts of the fourth embodiment which are identical to those of the first embodiment are denoted by identical reference characters, and will not be described below.

The fourth embodiment is different from the first embodiment in that the steering motor 80 assists with steering power in order to make the rider feel light in manually steering the steering swivel unit 13.

According to the fourth embodiment, the power transmitting path from the steering motor 80 (FIG. 14) to the steering shaft 32 includes a torque sensor (not depicted) for detecting a torque acting on the torque transmitting path. The torque sensor is connected to the controller 83.

The torque sensor detects, as a torque, the load imposed on the rider at the time the rider manually turns the steering swivel unit 13 with the steering handle 26.

On the basis of the detected value from the torque sensor, the controller 83 energizes the steering motor 80 in order to reduce the detected value, e.g., to 0. Drive power from the steering motor 80 thus assists in manually steering the steering swivel unit 13, making it easy for the rider to manually steer the front wheel 2.

Fifth Embodiment

A fifth embodiment of the present invention will be described below. Those parts of the fifth embodiment which are identical to those of the first embodiment are denoted by identical reference characters, and will not be described below.

The fifth embodiment is different from the first embodiment in that the vehicle includes a return-to-origin mechanism 710 (FIG. 25) for biasing the steering handle 26 with a biasing member 713 in order to bring the turned position of the steering handle 26 with respect to the vehicle frame 11 into the reference position referred to above.

Figure 25:
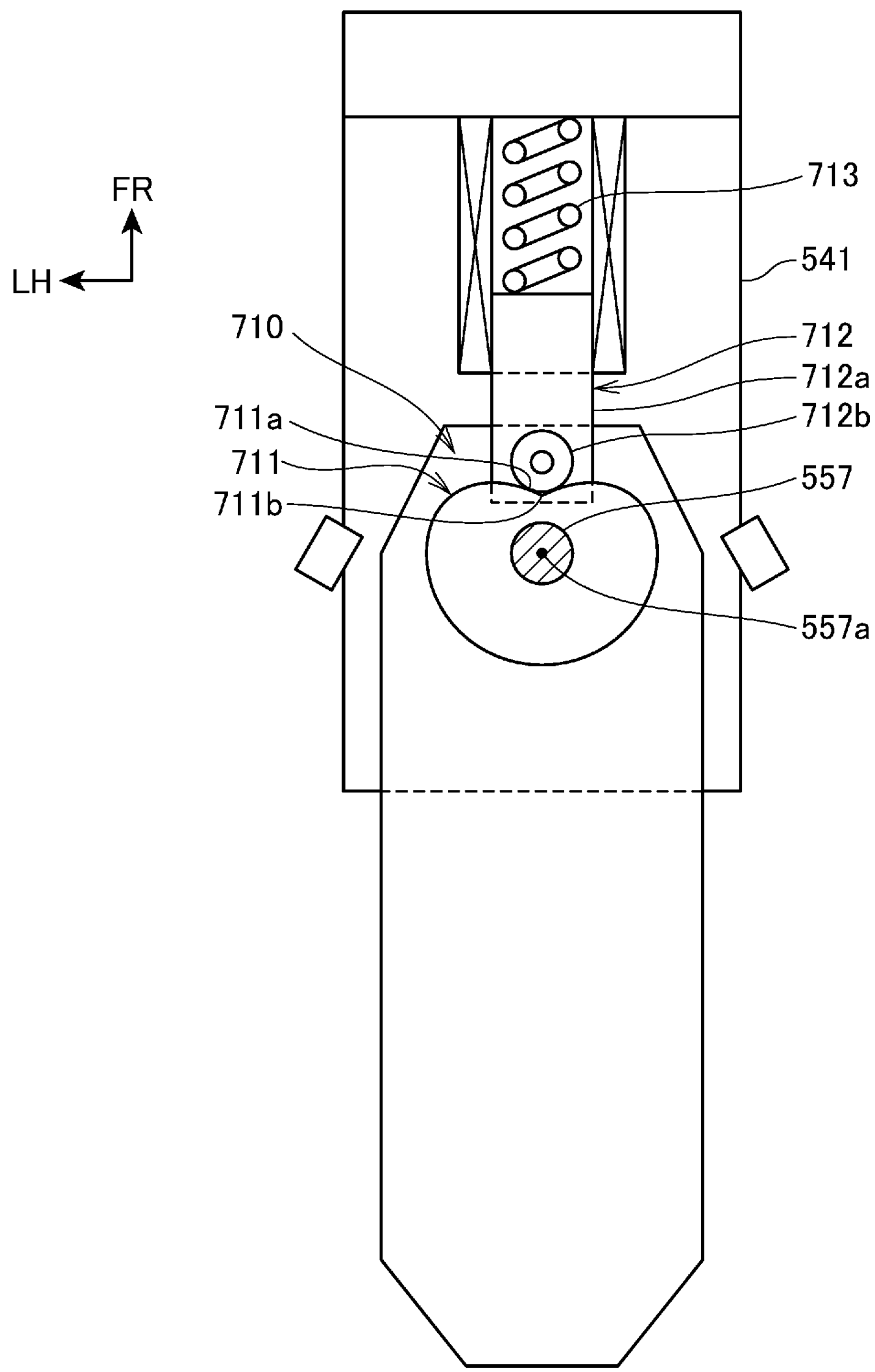
FIG. 25 is a schematic view depicting the structure of a return-to-origin mechanism.

FIG. 25 is a schematic view depicting the structure of the return-to-origin mechanism 710.

The return-to-origin mechanism 710 is provided on the case 541 depicted in FIG. 15, though the return-to-origin mechanism 710 is not illustrated in FIG. 15.

The return-to-origin mechanism 710 includes a cam 711 fixed to a turn shaft 557 of the steering handle turning mechanism 540, a presser 712 pressed against the cam 711, and the biasing member 713 for biasing the presser 712 to abut against the cam 711.

The cam 711 includes a substantially circular cam fitted over and fixed to the outer circumferential surface of the turn shaft 557, and is angularly movable in unison with the turn shaft 557. In other words, the cam 711 is angularly movable in unison with the steering handle 26.

The cam 711 has a recess 711*a* defined in a portion of the outer circumferential surface of the turn shaft 557, the recess 711*a* being concave toward the central axis 557*a* of the turn shaft 557. The recess 711*a* is concave in a substantially V shape.

The presser 712 includes a slider 712*a* movable toward and away from the cam 711 and an abutment 712*b* supported on the slider 712*a* and held in abutment with a surface of the cam 711 that defines the recess 711*a*. The slider 712*a* is supported on the case 541. The abutment 712*b* includes a roller angularly movable about an axis parallel to the central axis 557*a* of the turn shaft 557.

The biasing member 713 includes a helical spring for pressing the presser 712 against the cam 711. The biasing member 713 has an end held against the case 541 and the other end held against the slider 712*a*. The biasing member 713 is placed under compression between the case 541 and the slider 712*a*. The abutment 712*b* of the presser 712 is pressed into the recess 711*a* under a biasing force from the biasing member 713.

When the turned position of the steering handle 26 is the reference position referred to above (the steering angle is 0°), the cam 711 is in such an angular position that the recess 711*a* faces in a forward direction of the vehicle, as depicted in FIG. 25. In this reference position, the recess 711*a* has its bottom 711*b* positioned centrally in the transverse directions of the vehicle.

In the reference position, the abutment 712*b* fits snugly against the bottom 711*b* of the recess 711*a* from its front side.

The return-to-origin mechanism 710 keeps the turn shaft 557 in the angular position depicted in FIG. 25 by pressing the abutment 712*b* into the recess 711*a* of the cam 711 with the biasing member 713. The turned position of the steering handle 26 is thus kept in the reference position. In other words, the return-to-origin mechanism 710 produces a restoring force for keeping the turned position of the steering handle 26 in the reference position.

Figure 26:
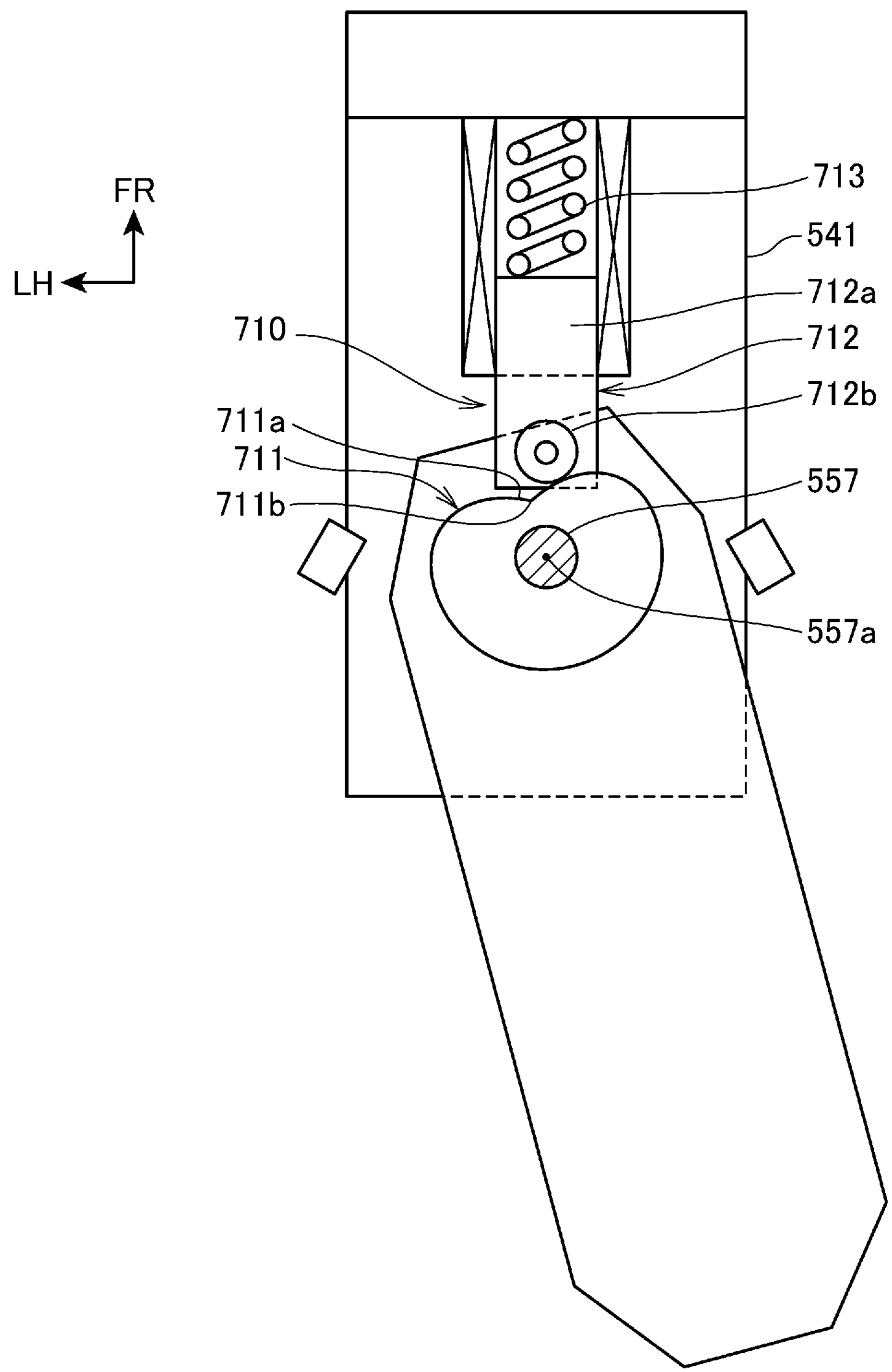
FIG. 26 is a schematic view depicting the state of the return-to-origin mechanism in which a steering handle has been turned.

FIG. 26 is a schematic view depicting the state of the return-to-origin mechanism 710 in which the steering handle 26 has been turned.

In FIG. 26, the handle turning motor 543 has turned the turn shaft 557 to turn the steering handle 26 with respect to the reference position. In this state, the handle turning motor 543 has turned the steering handle 26 against the restoring force produced by the return-to-origin mechanism 710.

In the state depicted in FIG. 26, if the handle turning motor 543 malfunctions and is unable to return the steering handle 26 to the reference position depicted in FIG. 25, then the steering handle 26 returns to the reference position under the restoring force from the return-to-origin mechanism 710. Therefore, even in the event of a malfunction of the handle turning motor 543, the steering handle 26 can quickly return to the reference position.

After having detected a malfunction of the handle turning motor 543, when the controller 83 detects that the steering handle 26 has returned to the reference position on the basis of a signal from the handle steering angle sensor 90, the controller 83 stops actuating the handle turning lock mechanism 544, locking the rotor 542 against rotation. Since the steering handle 26 is now unable to turn with respect to the steering swivel unit 13, the rider can steer the front wheel 2 through the steering handle 26 that has been fixed to the reference position.

Providing the restoring force from the return-to-origin mechanism 710 is sufficiently large, the rider can steer the front wheel 2 through the steering handle 26 that has been fixed to the reference position by the restoring force from the return-to-origin mechanism 710 even if the handle turning lock mechanism 544 does not lock the rotor 542 against rotation.

The above embodiments are given by way of illustrative example only, and the present invention should not be construed as being limited to the first through fifth embodiments described above.

In the first embodiment, the lower portion of the motor body 80*b* of the steering motor 80 is illustrated as being positioned in the space between the upper frames 18*b*. However, the present invention is not limited to such a layout. Rather, the motor body 80*b* of the steering motor 80 may be positioned above the space between the upper frames 18*b*, insofar as the motor body 80*b* is positioned between the left and right upper frames 18*b* in the transverse directions of the vehicle.

In the first through fifth embodiments, the vehicle has been illustrated as including a motorcycle. However, the present invention is not limited to such a vehicle, but is also applicable to three-wheel saddle riding vehicles including two front or rear wheels, saddle riding vehicles having four or more wheels, and saddle riding vehicles such as scooters or the like.

DESCRIPTION OF REFERENCE SYMBOLS

1: Vehicle
2: Front wheel
11: Vehicle frame
13: Steering swivel unit
17: Head pipe
18: Main frame
18*b*, 18*b*: Upper frames (left and right main frames)
31: Automatic steering mechanism (steering mechanism)
80: Steering motor (drive source)
80*a*: Rotational shaft
80*c*: Central axis
81: Steering link (link)
83: Controller
501, 501: Upper extensions
502: Speed reducer
503: Housing (cross member)
610: Transmitted torque changing mechanism
Cs: Steering axis

The invention claimed is:

1. A vehicle comprising, a vehicle frame;

a steering swivel unit supported on a head pipe of the vehicle frame and angularly movable about a steering axis;

a front wheel angularly movable in unison with the steering swivel unit;

a steering mechanism for angularly moving the steering swivel unit; and wherein said vehicle frame includes a main frame extending rearwardly from said head pipe, wherein said steering mechanism includes a drive source for angularly moving said steering swivel unit, said drive source being supported on said main frame, wherein said main frame includes a pair of left and right main frames extending rearwardly from said head pipe, said drive source being disposed in a position between said left and right main frames in a transverse direction of the vehicle, a pair of left and right upward extensions which extend upwardly from said left and right main frames, and wherein said drive source is supported on said main frame through said upward extensions and disposed between the left and right upward extensions.

2. The vehicle according to claim 1, wherein said drive source is disposed rearwardly of said head pipe and centrally in the transverse direction of the vehicle.

3. The vehicle according to claim 1, further comprising a cross member which interconnects the left and right upward extensions in the transverse direction of the vehicle, said drive source being mounted on a lower surface of said cross member.

4. The vehicle according to claim 3, wherein a speed reducer for reducing the speed of output power of said drive source is supported on said cross member.

5. The vehicle according to claim 1, wherein said drive source includes an electric motor and is disposed such that a central axis of a rotational shaft of said drive source is oriented in a vertical direction.

6. The vehicle according to claim 1, wherein said drive source is coupled to said steering swivel unit by a link which is positioned outwardly of said head pipe in the transverse direction of the vehicle.

7. The vehicle according to claim 1, wherein said steering mechanism includes a transmitted torque changing mechanism for changing a torque transmitted between said drive source and said steering swivel unit.

8. The vehicle according to claim 1, wherein said steering mechanism includes a separating mechanism for separating said drive source from a power transmitting path between said drive source and said steering swivel unit.

9. The vehicle according to claim 1, further comprising:

a torque sensor for detecting a torque produced between said steering swivel unit and said drive source; and a controller for controlling said drive source in order to reduce a detected value from said torque sensor.

* * * * *